US012704804B2

(12) United States Patent
Tagami et al.

(10) Patent No.: US 12,704,804 B2
(45) Date of Patent: Aug. 11, 2026

(54) SHEET CONVEYANCE APPARATUS AND IMAGE FORMING APPARATUS HAVING MULTIPLE DRIVEN ROLLERS SUPPORTED BY GUIDES IN A CURVED CONVEYANCE PATH

(71) Applicant: CANON KABUSHIKI KAISHA, Tokyo (JP)

(72) Inventors: Kenichi Tagami, Tokyo (JP); Keisuke Fujita, Kanagawa (JP); Ryosuke Oda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/441,224

(22) Filed: Feb. 14, 2024

(65) Prior Publication Data

US 2024/0302776 A1 Sep. 12, 2024

(30) Foreign Application Priority Data

Mar. 6, 2023 (JP) ................................ 2023-033989
Mar. 6, 2023 (JP) ................................ 2023-033990

(51) Int. Cl.
*G03G 15/00* (2006.01)
*B65H 5/06* (2006.01)
(Continued)

(52) U.S. Cl.
CPC ........... *G03G 15/6573* (2013.01); *B65H 5/06* (2013.01); *G03G 15/2053* (2013.01);
(Continued)

(58) Field of Classification Search
CPC ............. G03G 15/662; G03G 15/6573; G03G 15/2028; B65H 2402/441; B65H 2404/612; B65H 2404/54
See application file for complete search history.

(56) References Cited

U.S. PATENT DOCUMENTS 7,299,000 B2 * 11/2007 Taira .................. G03G 15/2028 399/322
7,796,930 B2 * 9/2010 Inomata ............. G03G 15/6573 399/405
(Continued)

FOREIGN PATENT DOCUMENTS

JP 2004-239937 A 8/2004
JP 2005-247544 A 9/2005
(Continued)

*Primary Examiner* — Arlene Heredia Ocasio
(74) *Attorney, Agent, or Firm* — VENABLE LLP

(57) ABSTRACT

A sheet conveyance apparatus includes a first nip portion to convey a sheet in a sheet conveyance direction, a second nip portion to convey the sheet, and a guide unit to form a curved conveyance path that curves with respect to the sheet conveyance direction. The guide unit includes a first guide, a second guide to form at least a part of a curved conveyance path with the first guide, a first driven roller rotatably supported by the first guide, and a second driven roller rotatably supported by the second guide. When viewed in a width direction orthogonal to the sheet conveyance direction, a part of the first guide is formed so as not to intersect with a straight line passing through a first contact point and a second contact point.

20 Claims, 11 Drawing Sheets

(51) Int. Cl.
*G03G 15/20* (2006.01)
*G03G 21/16* (2006.01)

(52) U.S. Cl.
CPC .... *B65H 2402/441* (2013.01); *B65H 2404/10* (2013.01); *B65H 2404/612* (2013.01); *B65H 2601/111* (2013.01); *G03G 15/2064* (2013.01); *G03G 21/1638* (2013.01)

(56) References Cited

U.S. PATENT DOCUMENTS

| | | | | |
|---|---|---|---|---|
| 2006/0092258 | A1* | 5/2006 | Taira | G03G 15/2028 347/156 |
| 2011/0157664 | A1* | 6/2011 | Samoto | B65H 1/266 358/498 |
| 2022/0026836 | A1* | 1/2022 | Kubo | G03G 15/2028 |
| 2024/0152092 | A1 | 5/2024 | Fujita et al. | |
| 2024/0176264 | A1* | 5/2024 | Sasaoka | G03G 15/607 |

FOREIGN PATENT DOCUMENTS

| | | | |
|---|---|---|---|
| JP | 2005-350202 | A | 12/2005 |
| JP | 2016-206475 | A | 12/2016 |
| JP | 2020-083578 | A | 6/2020 |

* cited by examiner

SHEET CONVEYANCE APPARATUS AND IMAGE FORMING APPARATUS HAVING MULTIPLE DRIVEN ROLLERS SUPPORTED BY GUIDES IN A CURVED CONVEYANCE PATH

BACKGROUND OF THE INVENTION

Field of the Invention

This disclosure relates to a sheet conveyance apparatus conveying a sheet, and an image forming apparatus including this sheet conveyance apparatus.

Description of the Related Art

In recent years, in image forming apparatuses such as printers and copy machines, there is a demand for miniaturization. This leads to the disposition of curved sheet conveyance paths, and there is a push to further reduce a radius of the curvature of these conveyance paths.

According to Japanese Patent Laid-Open No. 2005-350202, an image forming apparatus in which the curved sheet conveyance path is formed by a first guide plate and a second guide plate is suggested. A plurality of driven rotary members that are rotatably driven by the sheet are disposed on the first guide plate arranged on an outer side in a curving direction of the sheet conveyance path.

Generally, when the radius of the curvature of the curved sheet conveyance path decreases, conveyance resistance at the time of a passage through the sheet conveyance path increases. In particular, in a case of a sheet such as carboard that has a large grammage, there is the risk of the occurrence of defective conveyance when the conveyance resistance increases.

Further, in the image forming apparatus of Japanese Patent Laid-Open No. 2005-350202, by disposing the plurality of driven rotary members, the conveyance resistance of the sheet passing through the curved conveyance path is reduced. However, when a trailing edge of the sheet has passed through a conveyance roller pair disposed upstream of the sheet conveyance path in a sheet conveyance direction, sometimes, the trailing edge of the sheet collides with the first guide plate, and a substantial collision sound is generated.

SUMMARY OF THE INVENTION

According to a first aspect of the present invention, a sheet conveyance apparatus includes a first conveyance unit configured to form a first nip portion, the first conveyance unit being configured to convey a sheet in a sheet conveyance direction by the first nip portion, a second conveyance unit arranged downstream of the first conveyance unit in the sheet conveyance direction, the second conveyance unit being configured to convey the sheet, and a guide unit configured to form a curved conveyance path that curves with respect to the sheet conveyance direction, the guide unit being configured to guide the sheet conveyed by the first conveyance unit to the second conveyance unit. The guide unit includes a first guide, a second guide arranged on an inner side of the first guide in a curving direction of the curved conveyance path, and configured to form at least a part of the curved conveyance path with the first guide, a first driven roller rotatably supported by the first guide, and rotatably driven with respect to the sheet by coming into contact with the sheet, at a first contact point, conveyed through the curved conveyance path by the second conveyance unit, and a second driven roller rotatably supported by the second guide and arranged downstream of the first driven roller in the sheet conveyance direction, the second driven roller being rotatably driven with respect to the sheet by coming into contact with the sheet, at a second contact point, conveyed through the curved conveyance path by the second conveyance unit. When viewed in a width direction orthogonal to the sheet conveyance direction, the first guide is formed so as not to intersect with a straight line passing through the first contact point and the second contact point on a side further upstream than the first contact point in the sheet conveyance direction. The first contact point is closer to the second contact point than the first nip portion in the sheet conveyance direction.

According to a second aspect of the present invention, a sheet conveyance apparatus includes a first conveyance unit configured to form a first nip portion, the first conveyance unit being configured to convey a sheet in a sheet conveyance direction by the first nip portion, a second conveyance unit arranged downstream of the first conveyance unit in the sheet conveyance direction, the second conveyance unit being configured to convey the sheet, and a guide unit configured to form a curved conveyance path that curves with respect to the sheet conveyance direction, the guide unit being configured to guide the sheet conveyed by the first conveyance unit to the second conveyance unit. The guide unit includes a first guide, and a second guide arranged on an inner side of the first guide in a curving direction of the curved conveyance path, and configured to form at least a part of the curved conveyance path with the first guide, the sheet conveyed through the curved conveyance path by the first conveyance unit and the second conveyance unit coming into contact with the first guide at a first contact point, and coming into contact with the second guide at a second contact point. The guide unit includes a first guide, and a second guide arranged on an inner side of the first guide in a curving direction of the curved conveyance path, and configured to form at least a part of the curved conveyance path with the first guide, the sheet conveyed through the curved conveyance path by the first conveyance unit and the second conveyance unit coming into contact with the first guide at a first contact point, and coming into contact with the second guide at a second contact point. The first contact point is positioned upstream of the second contact point in the sheet conveyance direction, and is positioned on the same side as the second guide with respect to a nip line of the first nip portion when viewed in a width direction orthogonal to the sheet conveyance direction.

Further features of the present invention will become apparent from the following description of exemplary embodiments with reference to the attached drawings.

DESCRIPTION OF THE EMBODIMENTS

First Embodiment

Overall Configuration

Figure 1:
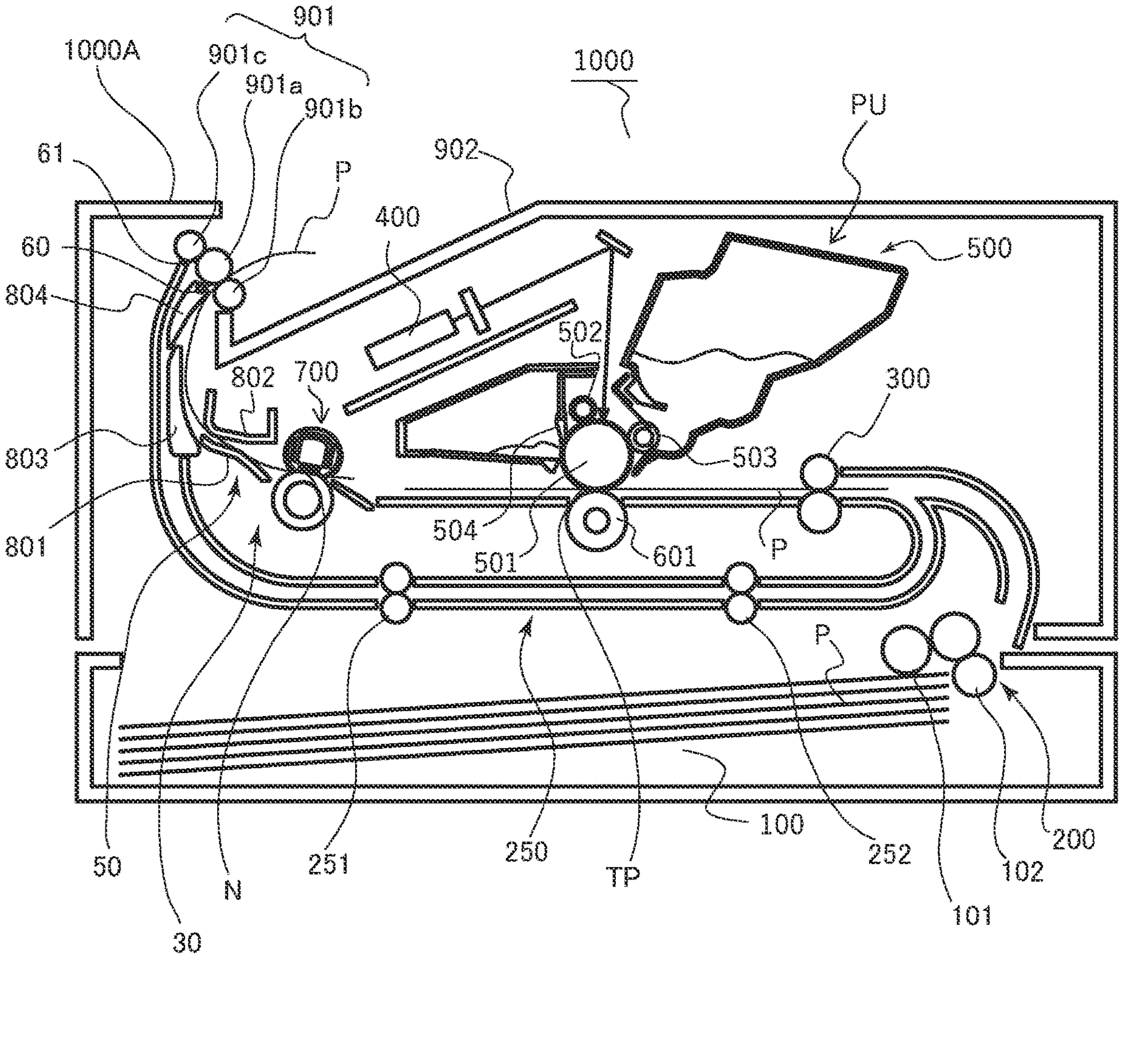
FIG. 1 is an overall schematic diagram illustrating a printer of a first embodiment.

First, a first embodiment of this disclosure will be described. A printer 1000, serving as an image forming apparatus of the first embodiment, is a laser beam printer of an electrophotographic system. As illustrated in FIG. 1, the printer 1000 includes a sheet feed unit 200 feeding a sheet P and an image forming unit PU forming an image on the sheet P. Further, the printer 1000 includes a sheet conveyance apparatus 30 and a duplex conveyance unit 250 for forming the image on both surfaces of the sheet.

The sheet conveyance apparatus 30 includes a fixing unit 700 fixing a toner image transferred onto the sheet on the sheet, a sheet discharge roller unit 901 discharging the sheet to a sheet discharge tray 902, and a guide unit 50. The guide unit 50 guides the sheet conveyed by the fixing unit 700 to the sheet discharge roller unit 901.

The image forming unit PU includes a scanner unit 400, a photosensitive drum 501, serving as an image bearing member, a charge roller 502, a developing roller 503, a drum cleaner 504, and a transfer roller 601. The photosensitive drum 501, the charge roller 502, the developing roller 503, the drum cleaner 504, and the like are incorporated into a cartridge form as a cartridge 500. The cartridge 500 is attachable and detachable with respect to an apparatus body 1000A of the printer 1000.

When an instruction of image formation is output to the printer 1000, based on image information input from such as an external computer connected to the printer 1000, an image forming process by the image forming unit PU is started. Based on the input image information, the scanner unit 400 emits a laser light toward the photosensitive drum 501. At this time, the photosensitive drum 501 has been charged beforehand by the charge roller 502, and, when the laser light is emitted, an electrostatic latent image is formed on a surface of the photosensitive drum 501. Thereafter, this electrostatic latent image is developed by the developing roller 503, and a toner image is formed on the photosensitive drum 501.

In parallel with the image forming operation described above, the sheet P stacked on a sheet feed tray 100 that is disposed in a lower part of the printer 1000 is fed by the sheet feed unit 200. To be noted, the sheet P may be stacked on a cassette that is drawable and attachable with respect to the apparatus body 1000A. The sheet P includes paper such as a paper sheet and an envelope, a plastic film such as a sheet for an overhead projector (OHP), cloth, and the like.

The sheet feed unit 200 includes a feed roller 101 feeding the sheet P and a separation roller pair 102 separating the sheet P fed by the feed roller 101 into one sheet at a time. The sheet P fed by the sheet feed unit 200 is conveyed to a registration roller pair 300. The registration roller pair 300 corrects skew by forming a loop in the sheet P, and, at a predetermined timing, conveys the sheet P toward a transfer nip TP formed by the photosensitive drum 501 and the transfer roller 601. The toner image formed on the surface of the photosensitive drum 501 is transferred onto the sheet P in the transfer nip TP, where a transfer bias is applied from the transfer roller 601. To be noted, after the toner image has been transferred onto the sheet P, toner remained on the photosensitive drum 501 is collected by the drum cleaner 504.

Further, the toner image is fixed by applying heat and pressure to the sheet P, which has passed through the transfer nip TP, in a fixing nip N, serving as a nip portion of the fixing unit 700, and, then, the sheet P is conveyed toward the sheet discharge roller unit 901 by the guide unit 50.

The sheet discharge roller unit 901, serving as a second conveyance unit, includes a sheet discharge drive roller 901*a*, a sheet discharge driven roller 901*b*, and a reverse driven roller 901*c*. The sheet discharge drive roller 901*a* is driven by a motor, not shown, and the sheet discharge driven roller 901*b* and the reverse driven roller 901*c* are rotatably driven by the sheet discharge drive roller 901*a*. The sheet discharge drive and driven rollers 901*a* and 901*b*, serving as a sheet discharge roller pair, form a sheet discharge nip 60, and the sheet discharge drive roller 901*a* and the reverse driven roller 901*c* form a reverse nip 61.

In a case of simplex printing, where the image is formed on one surface of the sheet P, the sheet P conveyed by the fixing unit 700 is guided to the sheet discharge nip 60 by a guide member 804. To be noted, the guide member 804 is pivotable at any timing by an actuator, not shown. Then, the sheet P is discharged outside of the printer 1000 by the sheet discharge nip 60, and is loaded on the sheet discharge tray 902.

In a case of duplex printing, where the image is formed on both surfaces of the sheet P, the sheet P on whose first surface the image has been formed is conveyed to the reverse nip 61 by the guide member 804. The sheet discharge drive roller 901*a* reverses rotation after a trailing edge of the sheet has passed through the guide member 804. Thereby, the sheet P is switchbacked by the reverse nip 61, and is conveyed toward the duplex conveyance unit 250.

The sheet P conveyed to the duplex conveyance unit 250 is again conveyed to the registration roller pair 300 by conveyance roller pairs 251 and 252. Then, the image is formed on a second surface of the sheet P in the transfer nip TP, and the sheet is discharged to the sheet discharge tray 902 by the sheet discharge nip 60.

Fixing Unit

Figure 2:
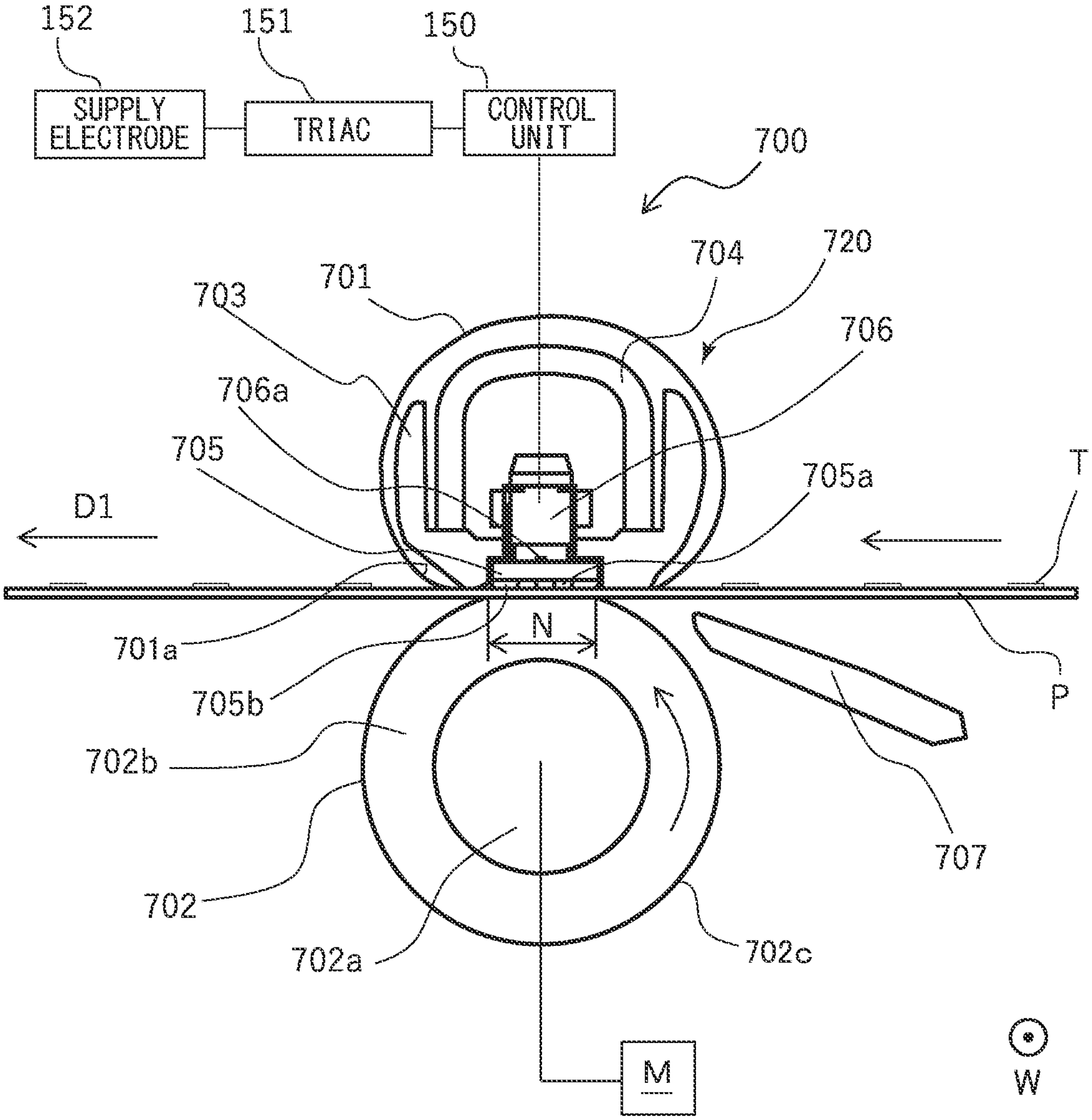
FIG. 2 is a cross-sectional view illustrating a fixing unit.

Next, using FIG. 2, a configuration of the fixing unit 700 will be described in detail. FIG. 2 is a cross-sectional view illustrating the fixing unit 700. As illustrated in FIG. 2, the fixing unit 700, serving as a first conveyance unit, includes a heating unit 720 and a pressing roller 702. The heating unit 720 includes a flexible and rotatable film 701, which is formed in a tubular shape, a heater holder 703, a heater 705, a stay 704, and a temperature detection device 706, which are arranged within an internal space of the film 701. The film 701, the heater 705, the heater holder 703, the stay 704, and the pressing roller 702 are members elongated in a width direction W orthogonal to a sheet conveyance direction D1 of the sheet P (direction orthogonal to a sheet surface of FIG. 2). The width direction W is a direction along a rotational axis of the photosensitive drum 501 (refer to FIG. 1). Further, the width direction W is a direction that is parallel to respective rotation axes of the film 701 and the pressing roller 702.

The film 701, serving as a heating rotary member, is a tubular heat resistant film having a three-layer structure. An innermost layer of the film 701 is a base layer, which bears mechanical characteristics such as torsion strength and surface smoothness. The base layer is made from a resin, such as polyimide, polyamidimide, polyether ether ketone, polyether sulfone, and polyphenylene sulfide.

A layer next to the base layer is a conductive primer layer. The conductive primer layer is a conductive layer in which conductive particles such as carbon black are dispersed, and serves as an adhesive that bonds a top layer to the base layer. An outermost layer is the top layer. The top layer is designed to have a suitable resistance value and film thickness so as to prevent various image defects.

An inner circumferential surface of the film 701 is supported by the heater holder 703, and the heater holder 703 supports the heater 705. The heater holder 703 is molded from a resin such as polyphenylene sulfide or liquid crystal polymer, which has heat resistance. The stay 704 holds and reinforces the heater holder 703. When the pressing roller 702 is driven by a motor M, the film 701 is rotatably driven with respect to the pressing roller 702, serving as a pressing rotary member. The heater holder 703 and the heater 705 constitute a nip forming unit that forms the fixing nip N with the pressing roller 702 through the film 701.

To be noted, instead of the configuration in which the heater 705 slidingly comes into contact with the inner circumferential surface of the film 701, it is acceptable to arrange a sheet-shaped or plate-shaped sliding member, which slidingly comes into contact with the inner circumferential surface of the film 701, between the heater 705 and the film 701. In such a case, the sliding member is also a part of the nip forming unit. The sliding member is preferably made of materials with high thermal conductivity, such as an iron alloy or aluminum.

The stay 704 is formed from metal such as iron or aluminum. The stay 704 suppresses the creep deformation of the heater holder 703. That is, the stay 704 serves to strengthen the stiffness of a support structure supporting the heater 705. Further, when the stay 704 receives an urging force from a spring, not shown, the heater holder 703 presses the inner circumferential surface 701*a* of the film 701 toward the pressing roller 702 via the stay 704. Thereby, a predetermined pressing force is generated in the fixing nip N. That is, the heater holder 703 is an example of a pressing member that presses the film 701 toward the pressing roller 702.

The heater 705 includes a heater substrate in which a pattern of a resistive heating element 705*a* is formed on a plate shaped ceramic substrate elongated in a longitudinal direction (width direction W). A surface of the heater 705 is coated with a glass layer 705*b*, serving as a protective layer covering the resistive heating element 705*a*. A detection element 706*a* of the temperature detection device 706 is arranged adjacently to a back surface of the heater 705.

The resistive heating element 705*a* generates the heat when electric power is supplied from a power supply circuit, not shown, via a supply electrode 152. A control unit 150 disposed in the apparatus body 1000A of the printer 1000 regulates a triac 151 through ON/OFF control to adjust an amount of the electric power supplied to the heater 705 such that a temperature detected by the temperature detection device 706 is maintained at a predetermined target temperature (fixing temperature). The control unit 150 includes equal to or more than one processor, including a central processing unit (CPU), and a memory providing a storage area. The control unit 150 controls each part of the printer 1000 through directing the CPU to load and execute a program from the memory.

The pressing roller 702 is an elastic roller including a core metal 702*a* made of metal such as iron or aluminum, an elastic body 702*b* made from a heat resistance material such as silicon rubber, and an outer layer 702*c* covering the elastic body 702*b*. The outer layer 702*c* of the pressing roller 702 includes a film of a fluororesin such as PFA, PTFE, and FEP, which possess good release properties with respect to the toner. Here, PFA, PTFE, and FEP are respectively tetrafluoroethylene-perfluoroalkyl vinyl ether copolymer, polytetrafluoroethylene, and perfluoro ethylene propylene copolymer.

The sheet P onto which the toner image has been transferred in the transfer nip TP is guided to the fixing nip N by a pre-fixing guide 707. The fixing unit 700 heats the toner image T on the sheet P by the film 701 that is heated by the heater 705, while, in the fixing nip N, nipping and conveying the sheet P between the film 701 and the pressing roller 702. Thereby, the toner image is softened by being heated and pressed, and is fixed (adhered) on the sheet P.

Guide Unit

Figure 3:
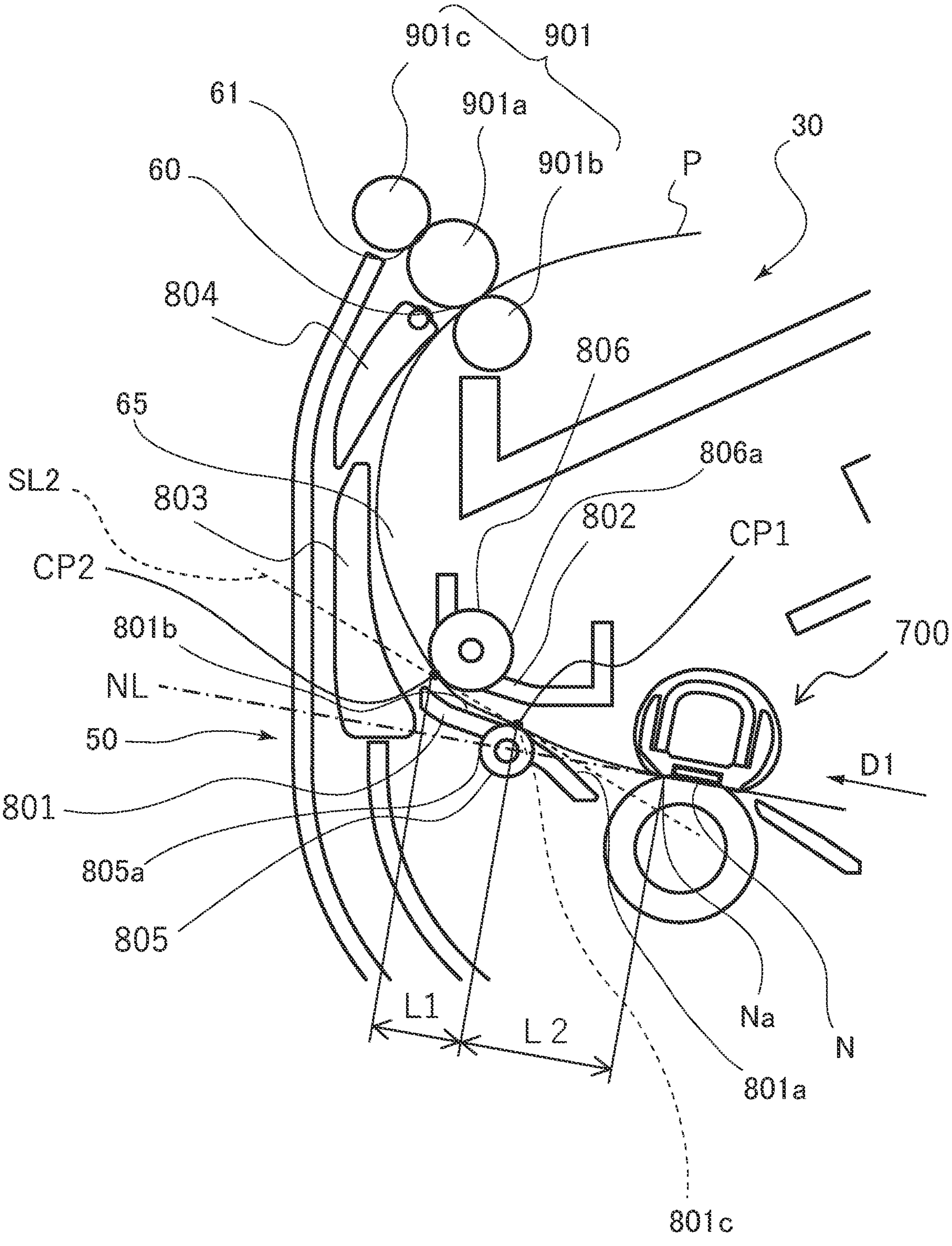
FIG. 3 is a cross-sectional view illustrating a guide unit.

Next, the guide unit 50 of the sheet conveyance apparatus 30 of the present embodiment will be described. FIG. 3 is a cross-sectional view illustrating the guide unit 50. As illustrated in FIG. 3, the guide unit 50 forms a curved conveyance path 65 curving with respect to the sheet conveyance direction D1, and guides the sheet P conveyed by the fixing unit 700 toward the sheet discharge roller unit 901. The guide unit 50 includes a first guide 801, a second guide 802, a third guide 803, the guide member 804, a first driven roller 805, and a second driven roller 806.

The first guide 801 is arranged downstream of the fixing unit 700 in the sheet conveyance direction D1, and guides a non-printing surface side of the sheet. The second guide 802 is arranged downstream of the fixing unit 700 in the sheet conveyance direction D1, and is arranged on an inner side of the first guide 801 in a curving direction of the curved conveyance path 65. Further, the second guide 802 faces the first guide 801, and forms at least a part of the curved conveyance path 65 with the first guide 801.

The third guide 803 forms part of the curved conveyance path 65, and guides the sheet P upward in a vertical direction. As described above, the guide member 804 sets the destination for the conveyance of the sheet P to either the sheet discharge nip 60 or the reversing nip 61 by pivoting, and forms part of the curved conveyance path 65.

The first driven roller 805 is rotatably supported by the first guide 801, and comes into contact with the sheet P conveyed through the curved conveyance path 65. Thereby, the first driven roller 805 is rotatably driven with respect to the sheet P. The first driven roller 805 is arranged on the same side as the pressing roller 702 with respect to the curved conveyance path 65. The second driven roller 806 is rotatably supported by the second guide 802, and is arranged downstream of the first driven roller 805 in the sheet conveyance direction D1. By coming into contact with the sheet P conveyed through the curved conveyance path 65, the second driven roller 806 is rotatably driven with respect to the sheet P. That is, each of the first and second driven rollers 805 and 806 is configured not to nip the sheet P conveyed through the curved conveyance path 65.

Hereinafter, a contact point at which the sheet P conveyed through the curved conveyance path 65 by the sheet discharge nip 60 of the sheet discharge roller unit 901 comes into contact with the first driven roller 805 is referred to as a first contact point CP1. Further, a contact point at which the sheet P conveyed through the curved conveyance path 65 by the sheet discharge nip 60 comes into contact with the second driven roller 806 is referred to as a second contact point CP2.

At this time, in the sheet conveyance direction D1, the contact point CP1 is closer to the second contact point CP2 than the fixing nip N of the fixing unit 700. That is, in a direction along a nip line NL of the fixing nip N, a distance L1 between the first and second contact points CP1 and CP2 is shorter than a distance L2 between the first contact point CP1 and the fixing nip N (L1<L2).

When viewed in the width direction W (refer to FIG. 5) that is a direction orthogonal to a sheet surface of FIG. 3, the first guide 801 is shaped into a convex arc that projects toward the second guide 802. In particular, the first guide 801 includes a first guide surface 801*a* and a second guide surface 801*b* that is formed continuously to a vertex 801*c* which is a downstream end of the first guide surface 801*a* in the sheet conveyance direction D1. The first guide surface 801*a* is inclined to approach the second guide 802 toward a downstream side in the sheet conveyance direction D1. At the vertex 801*c*, the second guide surface 801*b* bends from the first guide surface 801*a*, and extends along the second guide 802. That is, the first guide 801 is configured with a concave shape in which the vertex 801*c* serves as a projecting tip between the first and second guide surfaces 801*a* and 801*b*.

In the present embodiment, when viewed in the width direction W, the first contact point CP1 of the first driven roller 805 is arranged to project approximately 0.5 millimeters (mm) into the curved conveyance path 65 from the vertex 801*c* of the first guide 801. In other words, when viewed in the width direction W, an outer circumferential surface 805*a* of the first driven roller 805 is arranged to project approximately 0.5 mm into the curved conveyance path 65 from the vertex 801*c* of the first guide 801. That is, when viewed in the width direction W, the first driven roller 805 is arranged to overlap the vertex 801*c* of the first guide 801. Further, when viewed in the width direction W, an outer circumferential surface 806*a* of the second driven roller 806 is also arranged to project approximately 0.5 mm into the curved conveyance path 65 from the second guide 802. To be noted, each of projecting amounts of the outer circumferential surface 805*a* of the first driven roller 805 and the outer circumferential surface 806*a* of the second driven roller 806 from the first guide 801 and the second guide 802 can be set to any desired value.

A leading edge of the sheet P conveyed through the curved conveyance path 65 by the fixing unit 700 first comes into contact with the first guide surface 801*a* of the first guide 801. This is because the first guide surface 801*a* is arranged to intersect with a nip line NL of the fixing nip N. Then, the sheet P is guided toward the third guide 803 by the first guide surface 801*a* and the first and second driven rollers 805 and 806. The sheet P is guided further upward by the third guide 803, and is guided to the sheet discharge nip 60 by the guide member 804. That is, the sheet P is curved toward the printing surface side by the guide unit 50, and an orientation of the sheet P is altered. At this time, the sheet P is conveyed with the posture of the sheet P regulated through contact with three points: a downstream end portion Na of the fixing nip N in the sheet conveyance direction D1, the first driven roller 805, and the second driven roller 806. Therefore, a vibration of the sheet Pin a thickness direction of the sheet P is reduced, and the sheet P is conveyed with the posture stabilized.

Figure 4A:
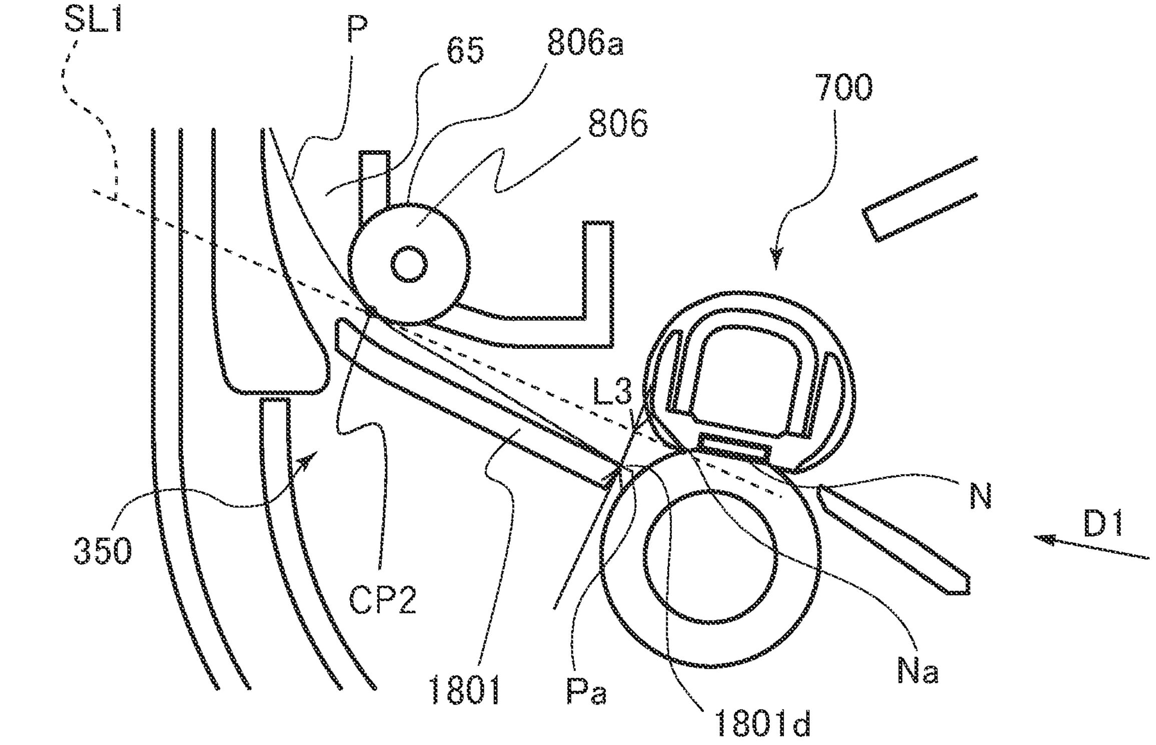
FIG. 4A illustrates a cross-sectional view of a guide unit as a comparative example.
Figure 4B:
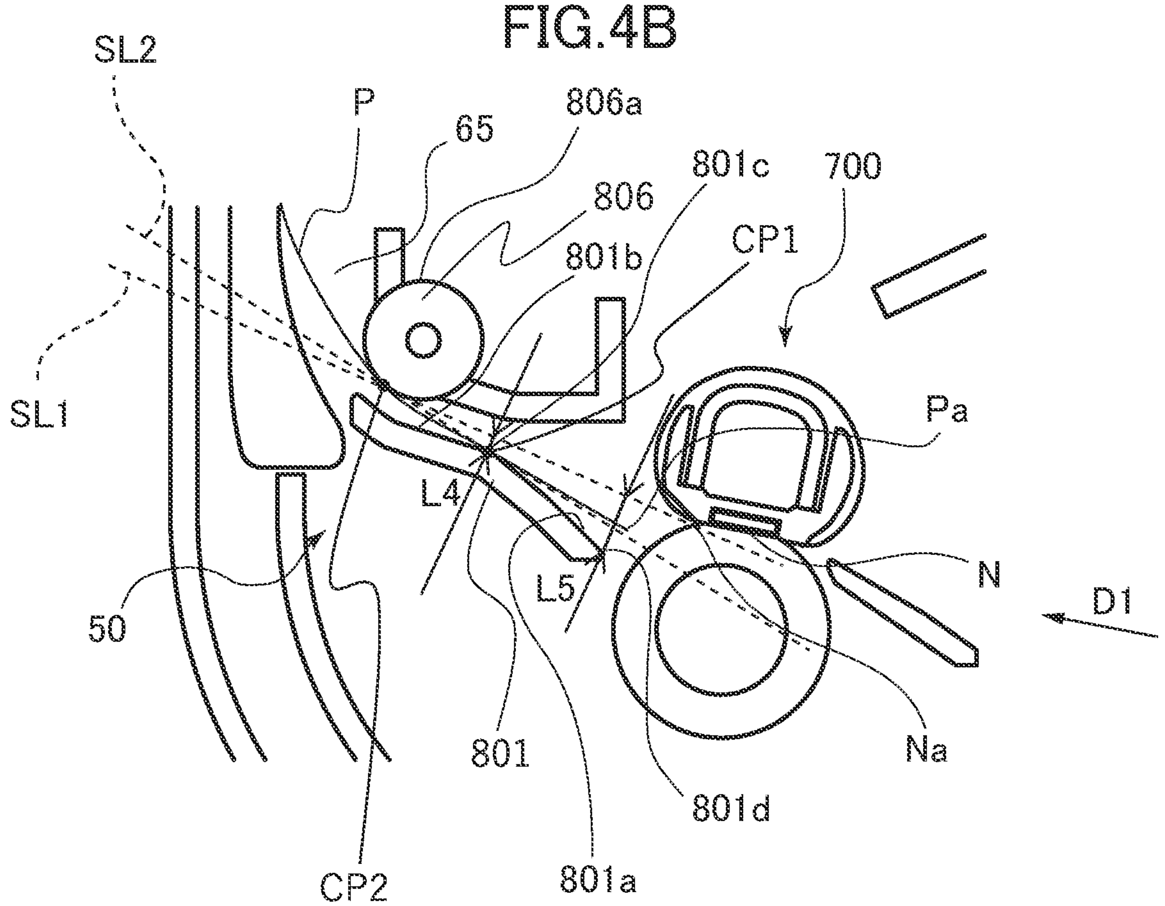
FIG. 4B is a cross-sectional view illustrating the guide unit of the first embodiment.

FIG. 4A illustrates a cross-sectional view of a guide unit 350 as a comparative example, and FIG. 4B is a cross-sectional view illustrating the guide unit 50 of the present embodiment. The guide unit 350, as the comparative example, includes a first guide 1801 instead of the first guide 801 of the present embodiment, and, except for the incorporation of the first guide 1801, the guide unit 350 has a configuration similar to the present embodiment.

In the comparative example, the first guide 1801 does not have the convex arc shape as in the first guide 801 of the present embodiment, but is a guide having a substantially linear shape. As illustrated in FIG. 4A, in the comparative example, when a trailing edge Pa of the sheet P has passed through the fixing nip N, the sheet P whose posture has been curved along the curved conveyance path 65 attempts to return from the curved posture due to the inherent rigidity of the sheet. Thereby, the trailing edge Pa of the sheet P that has passed through the fixing nip N collides with the first guide 1801, and generates a collision sound.

Here, when viewed in the width direction W, a straight line passing through the second contact point CP2 and the downstream end Na in the sheet conveyance direction D1 of the fixing nip N is referred to as a straight line SL1. At this time, a distance between the straight line SL1 and an upstream end 1801*d*, with which the trailing edge Pa of the sheet P collides, in the sheet conveyance direction of the first guide 1801 becomes a distance L3. The distance L3 corresponds to a displacement amount of the sheet P from the time at which the trailing edge Pa of the sheet P has passed through the fixing nip N until the sheet P collides with first guide 1801.

On the other hand, as illustrated in FIG. 4B, in the present embodiment, when the trailing edge Pa of the sheet P has passed through the fixing nip N, the sheet P that attempts to return from the curved posture is received by the vertex 801*c* and the first contact point CP1 of the first driven roller 805. To be noted, in FIGS. 4A and 4B, the first driven roller 805 is not shown.

As described above, the first contact point CP1 is located between the fixing nip N and the second contact point CP2 in the sheet conveyance direction D1, and is located near the second contact point CP2. Further, a distance between the straight line SL1 and the first contact point CP1 is a distance L4 that is shorter than the distance L3 (L4<L3). The distance L4 corresponds to a displacement amount of the sheet P from the time at which the trailing edge Pa of the sheet P has passed through the fixing nip N until the sheet P collides with first guide 801. Therefore, in the present embodiment, in comparison with the comparative example, energy (speed) at the time of a collision of the sheet P with the first guide 801 is small, and it is possible to reduce the collision sound.

Further, since the first guide 801 of the present embodiment includes the first guide surface 801*a*, a distance between the straight line SL1 and the upstream end 801*d* in the sheet conveyance direction D1 of the first guide surface 801*a* becomes a distance L5. The distance L5 is larger than the distance L4 (L5>L4), and the first guide surface 801*a* can be said to be retracted from the curved conveyance path 65 at a point close to an exit of the fixing nip N. In other words, when viewed in the width direction W, the first contact point CP1 is closer with respect to the straight line SL1 than the upstream end 801*d* of the first guide surface 801*a*.

Further, a straight line passing through the first and second contact points CP1 an CP2 is referred to as a straight line SL2. Since the first guide surface 801*a* is disposed, when viewed in the width direction, the first guide 801 is formed not to intersect with the straight line SL2 on a side further upstream than the first contact point CP1 in the sheet conveyance direction D1. When the trailing edge Pa of the sheet P has passed through the fixing nip N, using the second contact point CP2 as a fulcrum, the sheet P alters the posture so as to align with the straight line SL2. However, since the first guide 801 is formed not to intersect with the straight line SL2 on the side further upstream than the first contact point CP1 in the sheet conveyance direction D1, the first guide 801 first comes into contact with the sheet Pat the first contact point CP1. Thereby, when the trailing edge Pa of the sheet P has passed through the fixing nip N, the trailing edge Pa does not collide with the first guide surface 801*a*. Therefore, it is possible to reduce the collision sound generated at the time of the collision of the sheet P with the first guide 801.

However, the first guide 801 of the present embodiment is in the convex shape projecting toward the second guide 802 with the vertex 801*c* as the projecting tip, which serves as a factor to decrease the radius of the curvature of the curved conveyance path 65. When the radius of the curvature of the curved conveyance path 65 decreases, conveyance resistance at the time of a passage of the sheet P through the curved conveyance path 65 increases. For example, when the conveyance resistance at the time of a passage of cardboard with a grammage of equal to or more than 120 grams per square meters ($g/m^2$) through the curved conveyance path 65 becomes larger than a conveyance force of the sheet discharge nip 60, the sheet discharge nip 60 cannot convey the sheet P, and the sheet P slips in the sheet discharge nip 60.

Therefore, in the present embodiment, by disposing the outer circumferential surface 805*a* (refer to FIG. 3) of the first driven roller 805 such that the outer circumferential surface 805*a* is more projected into the curved conveyance path 65 by approximately 0.5 mm than the vertex 801*c* of the first guide 801, the friction resistance of the sheet P is reduced by the rotation of the first driven roller 805. Thereby, it is possible to achieve both the reduction of the collision sound between the sheet P and first guide 801 and the reduction of the conveyance resistance of the sheet P. Further, since it is possible to reduce the conveyance resistance of the sheet P, it is possible to suppress the generation of wrinkles in the sheet P with a simple configuration. However, when the outer circumferential surface 805*a* projects into the curved conveyance path 65 further than the vertex 801*c* of the first guide 801, the radius of the curvature of the curved conveyance path 65 decreases. Therefore, it is preferable that the outer circumferential surface 805*a* of the first driven roller 805 does not project significantly beyond the vertex 801*c* of the first guide 801.

Figure 5:
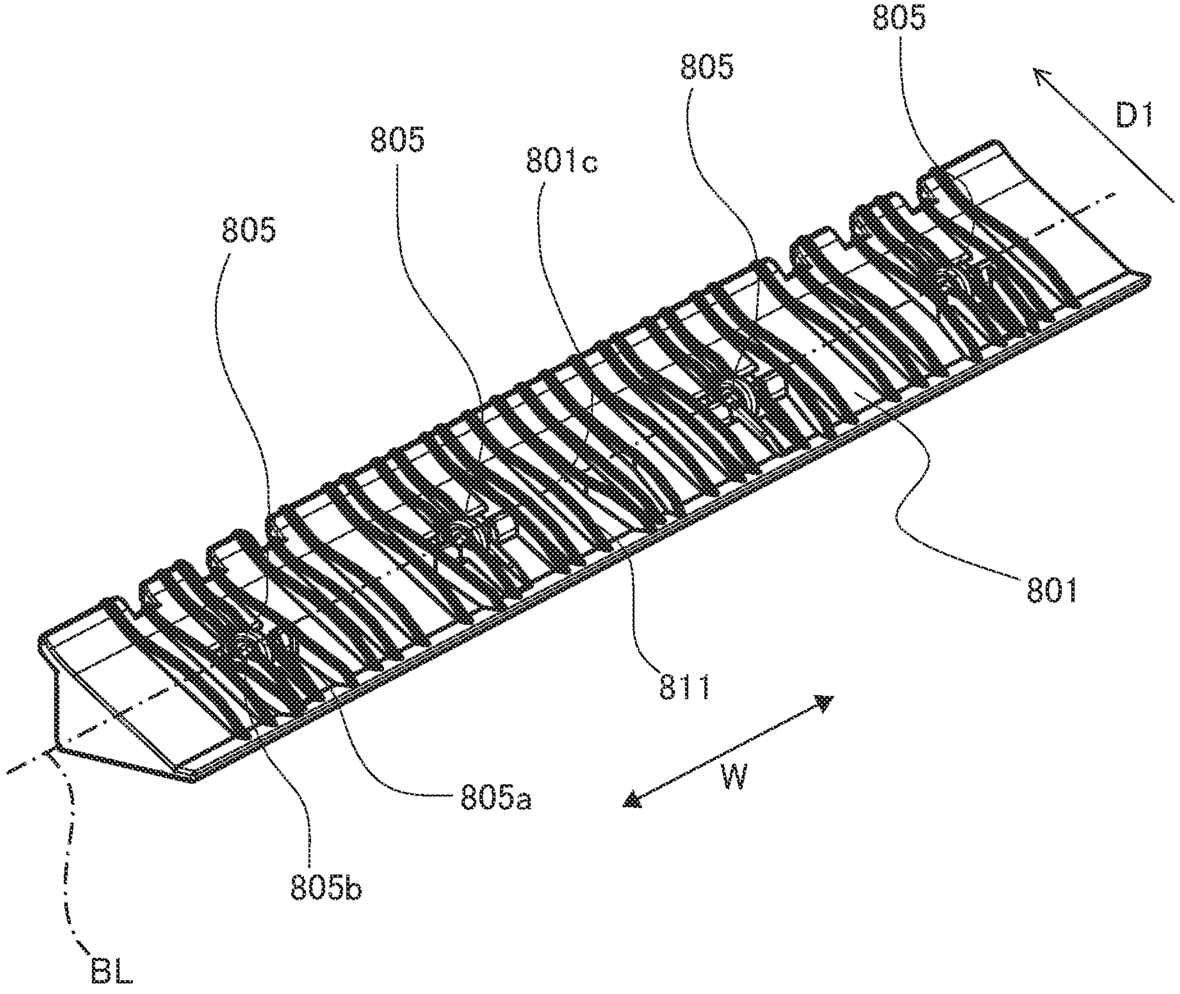
FIG. 5 is a perspective view illustrating a first driven roller and a first guide.

FIG. 5 is a perspective view illustrating the first driven roller 805 and the first guide 801. As illustrated in FIG. 5, the first guide 801 includes a plurality of ribs 811 projecting toward the second guide 802 and extending along the sheet conveyance direction D1. The plurality of ribs 811 are arranged in parallel in the width direction W. The first and second surfaces 801*a* and 801*b* (refer to FIG. 3) of the first guide 801 are constituted by distal end portions of the plurality of ribs 811. That is, the plurality of ribs 811 have a gentle arch shape, and a dashed line BL in FIG. 5 corresponds to positions of the vertices 801*c* of the first guide 801. A plurality (in the present embodiment, 4 rollers) of first driven rollers 805 are arranged in parallel along the width direction W, and the outer circumferential surface 805*a* of each of the first driven rollers 805 is arranged to project approximately 0.5 mm into the curved conveyance path 65 from the vertex 801*c*. Further, a rotation shaft 805*b* of the first driven roller 805 is parallel with respect to the width direction W. To be noted, a rotation shaft of the second driven roller 806 is also parallel with respect to the width direction W.

To be noted, while the four first driven rollers 805 are disposed in the present embodiment, it Is not limited to this. Under the design conditions of passable paper sizes and grammages in the product specifications, the radius of the curvature of the curved conveyance path 65, and the conveyance force of the sheet discharge roller unit 901, the number of the first driven rollers 805 required for installation may be determined so as to ensure the cardboard conveyance performance described above. Further, it is also acceptable to dispose a plurality of second driven rollers 806 in parallel in the width direction W. Under the design conditions of the passable paper sizes and grammages in the product specifications, the radius of the curvature of the curved conveyance path 65, and the conveyance force of the sheet discharge roller unit 901, the number of the second driven rollers 806 required for installation may be determined so as to ensure the cardboard conveyance performance described above.

As described above, in the present embodiment, the first guide 801 formed in the concave shape toward the second guide 802 using the vertex 801*c* as the projecting tip is disposed, and the first driven roller 805 is disposed in alignment with the vertex 801*c*. Thereby, it is possible to reduce the collision sound generated at the time of the collision of the sheet P with the first guide 801, which occurs when the trailing edge Pa of the sheet P has passed through the fixing nip N. Further, by the rotation of the first driven roller 805, it is possible to reduce the conveyance resistance of the sheet P. That is, it is possible to achieve both the reduction of the collision sound between the sheet P and the first guide 801 and the decrease in the conveyance resistance of the sheet P.

Second Embodiment

While, next, a second embodiment of this disclosure will be described, postures of the first and second driven rollers 805 and 806 of the first embodiment are changed in the second embodiment. Therefore, configurations similar to the first embodiment will be described by omitting illustrations or by putting the same reference characters on drawings herein.

Figure 6A:
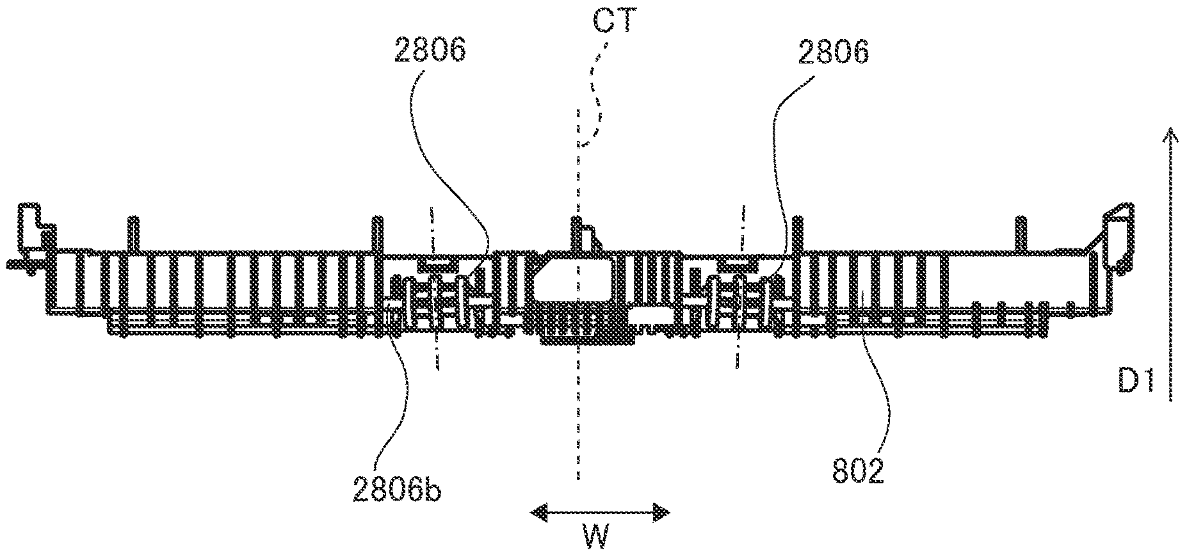
FIG. 6A is a front view illustrating a second driven roller and a second guide of a second embodiment.
Figure 6B:
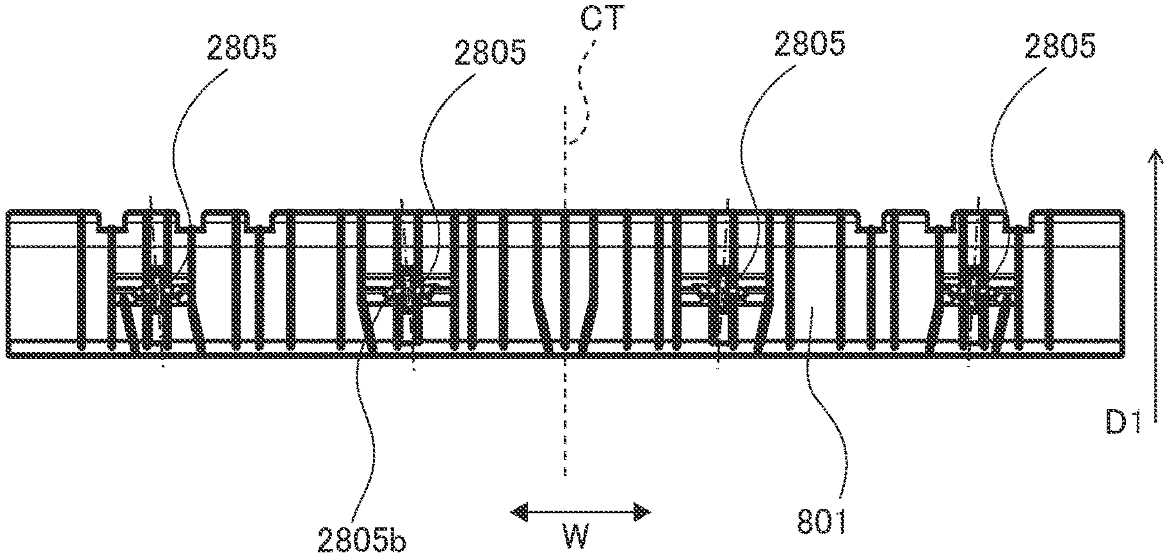
FIG. 6B is a front view illustrating a first driven roller and the first guide of the second embodiment.

FIG. 6A is a front view illustrating second driven rollers 2806 and the second guide 802 of the second embodiment, and FIG. 6B is a front view illustrating first driven rollers 2805 and the first guide 801 of the second embodiment.

As illustrated in FIG. 6A, a plurality (in this embodiment, two rollers) of second driven rollers 2806 are disposed in parallel in the width direction W. These second driven rollers 2806 are arranged in line symmetry with respect to a center line CT in the width direction W of the curved conveyance path 65 as a center. Further, a rotation shaft 2806*b* of each of the second driven rollers 2806 is inclined with respect to the width direction W. In particular, the two second driven rollers 2806 convey the sheet P such that the sheet P is extended downstream in the sheet conveyance direction D1 and outward in the width direction W.

In the first embodiment described above, the sheet P comes into contact with the second driven roller 806 at the second contact point CP2. Immediately after the passage through the fixing nip N, the sheet P is at a high temperature, and, also, the toner image fixed on the sheet P is in a high-temperature state. When, in such a state, the printing surface side of the sheet P comes into contact with the second driven roller 2806 at the second contact point CP2, sometimes, the toner is retransferred onto the second driven roller 2806, and roller soiling occurs.

When the toner adheres to the second driven roller 2806, adhered toner particles act as a nucleus, and lead to the progression of toner soiling. When the toner soiling adhered to the second driven roller 2806 increases, issues such as an abnormal noise at the time of the sheet conveyance, a conveyance jam, and image defects arise.

Therefore, in the present embodiment, by disposing the second driven roller 2806 in a manner inclined with respect to the sheet conveyance direction D1 and the width direction W, it is configured such that the toner does not easily adhere to the second driven roller 2806. Further, since the second driven roller 2806 is angled with respect to the sheet conveyance direction D1, when the second driven roller 2806 is rotatably driven by the sheet P, slippage in a direction different from the sheet conveyance direction D1 occurs between the sheet P and the second driven roller 2806.

Therefore, even in a case where the toner is retransferred onto the second driven roller 2806 as described above, the toner soiling adhered to the second driven roller 2806 is gradually ejected to a side surface side of the second driven roller 2806. Therefore, it is possible to clean the toner adhered to an outer circumferential surface of the second driven roller 2806, and it is possible to reduce the occurrence of an abnormal noise at the time of the sheet conveyance, the conveyance jam, and the image defects resulting from the toner soiling.

Similarly, as illustrated in FIG. 6B, a plurality (in this embodiment, four rollers) of first driven rollers 2805 are disposed in parallel in the width direction W. These first driven rollers 2805 are arranged in line symmetry with respect to the center line CT in the width direction W of the curved conveyance path 65 as a center. Further, a rotation shaft 2805*b* of each of the first driven rollers 2805 is inclined with respect to the width direction W. In particular, the four first driven rollers 2805 convey the sheet P such that the sheet P is extended downstream in the sheet conveyance direction D1 and outward in the width direction W.

In a case of the duplex printing, the toner image formed on the first surface of the sheet P comes into contact with the first driven roller 2805. Therefore, a functional effect of inclining the first driven roller 2805 with respect to the sheet conveyance direction D1 and the width direction W is similar to the functional effect of inclining the second driven roller 2806.

Third Embodiment

While, next, a third embodiment of this disclosure will be described, in the third embodiment, a door 808 for jam processing is disposed to the apparatus body 1000A of the first embodiment. Therefore, configurations similar to the first embodiment will be described by omitting illustrations or by putting the same reference characters on drawings herein.

Figure 7A:
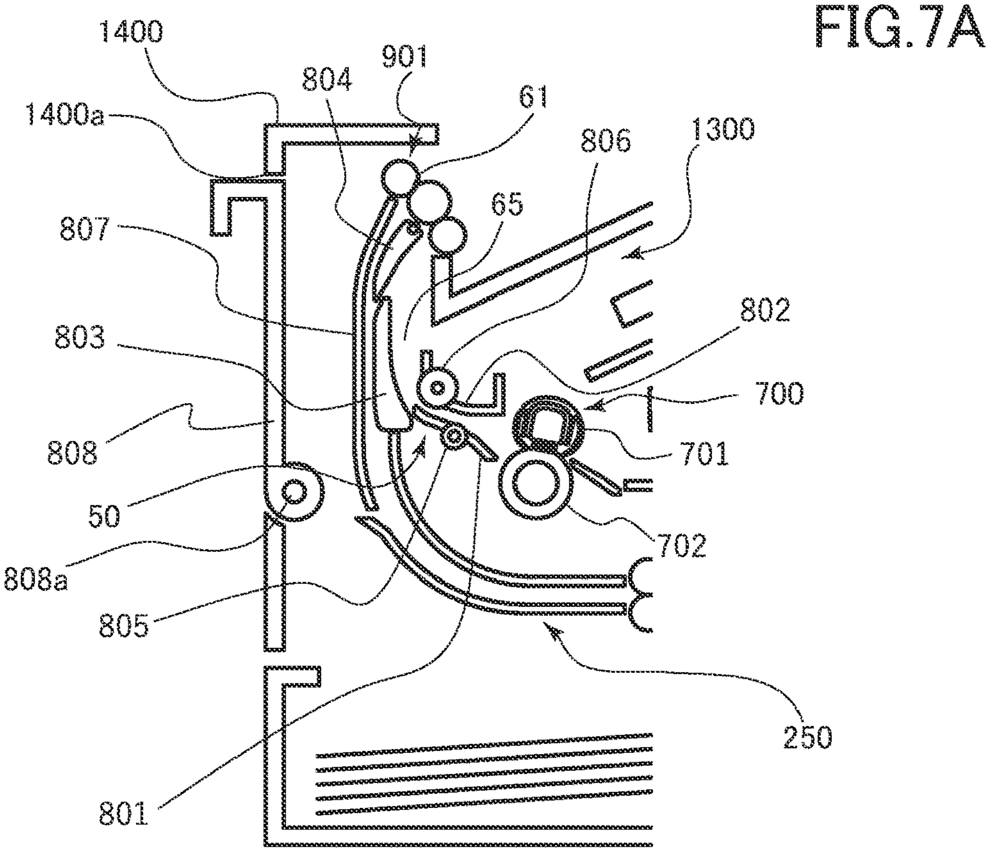
FIG. 7A is a cross-sectional view illustrating a printer at the time when a door of a third embodiment is positioned in a closed position.
Figure 7B:
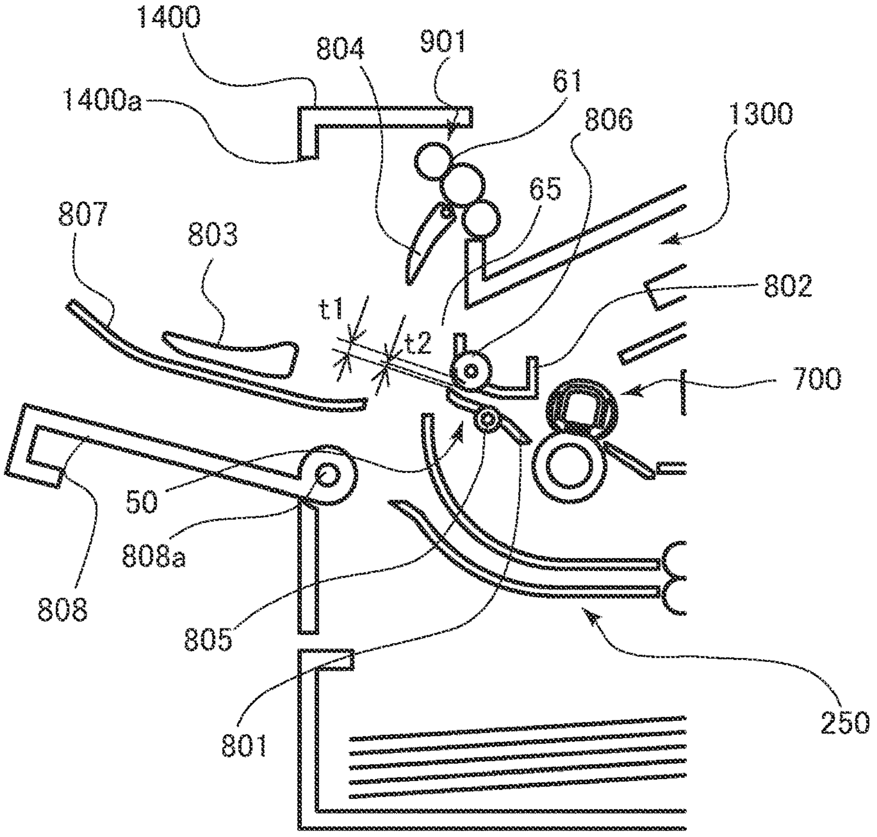
FIG. 7B is a cross-sectional view illustrating the printer at the time when the door of the third embodiment is positioned in an opening position.

FIG. 7A is a cross-sectional view illustrating a printer 1300 at the time when the door 808 of the third embodiment is positioned in a closed position, and FIG. 7B is a cross-sectional view illustrating the printer 1300 at the time when the door 808 of the third embodiment is positioned in an opening position.

As illustrated in FIG. 7A, the printer 1300, serving as an image forming apparatus of the third embodiment, includes a casing 1400 accommodating the fixing unit 700, the sheet discharge roller unit 901, and the guide unit 50, and the door 808. An opening 1400*a* is disposed in the casing 1400, and the door 808 is supported by the casing 1400 in an openable and closable manner around a pivot shaft 808*a* as a center. The door 808 closes the opening 1400*a* at the closed position illustrated in FIG. 7A, and opens the opening 1400*a* at the opening position illustrated in FIG. 7B. That is, the door 808 is configured to open and close the opening 1400*a*.

A duplex conveyance guide 807 and the third guide 803 are supported by the door 808, and these duplex conveyance guide 807 and third guide 803 move with the door 808. The duplex conveyance guide 807 guides the sheet P reversed by the reverse nip 61 to the duplex conveyance unit 250.

In a case where a jam has occurred in the curved conveyance path 65 or the duplex conveyance unit 250, a user opens the door 808. Thereby, the opening 1400*a* of the casing 1400 is opened, and the first and second guides 801 and 802 and the second driven roller 806 are exposed to an outside of the sheet conveyance apparatus 30 via the opening 1400*a*. That is, a gap t1 between the first and second guides 801 and 802 and a gap t2 between the first guide 801 and the second driven roller 806 are exposed to an outside of the sheet conveyance apparatus 30 via the opening 1400*a*.

Further, by opening the door 808, a section of the curved conveyance path 65 from downstream ends in the sheet conveyance direction D1 of the first and second guides 801 and 802 to an upstream end in the sheet conveyance direction D1 of the guide member 804 is opened. Thereby, the user can remove the sheet P that has jammed in the curved conveyance path 65 and the duplex conveyance unit 250.

Further, the first and second guides 801 and 802 are configured not to allow the user to access the fixing unit 700 via the gap t1 described above. Similarly, the first guide 801 and second driven roller 806 are configured not to allow the user to access the fixing unit 700 via the gap t2 described above. In particular, the gaps t1 and t2 are set such that the test finger as stipulated in International Electrotechnical Commission (IEC) 62368-1 cannot be inserted. This is to prevent the user from coming into contact with the fixing unit 700 which has become a high temperature.

Fourth Embodiment

While, next, a fourth embodiment of this disclosure will be described, the fourth embodiment is configured by omitting the first and second driven rollers 805 and 806 of the first embodiment. Therefore, configurations similar to the first embodiment will be described by omitting illustrations or by putting the same reference characters on drawings herein.

Guide Unit

Next, a guide unit 50 of the sheet conveyance apparatus 30 related to the fourth embodiment will be described. FIG.

Figure 8A:
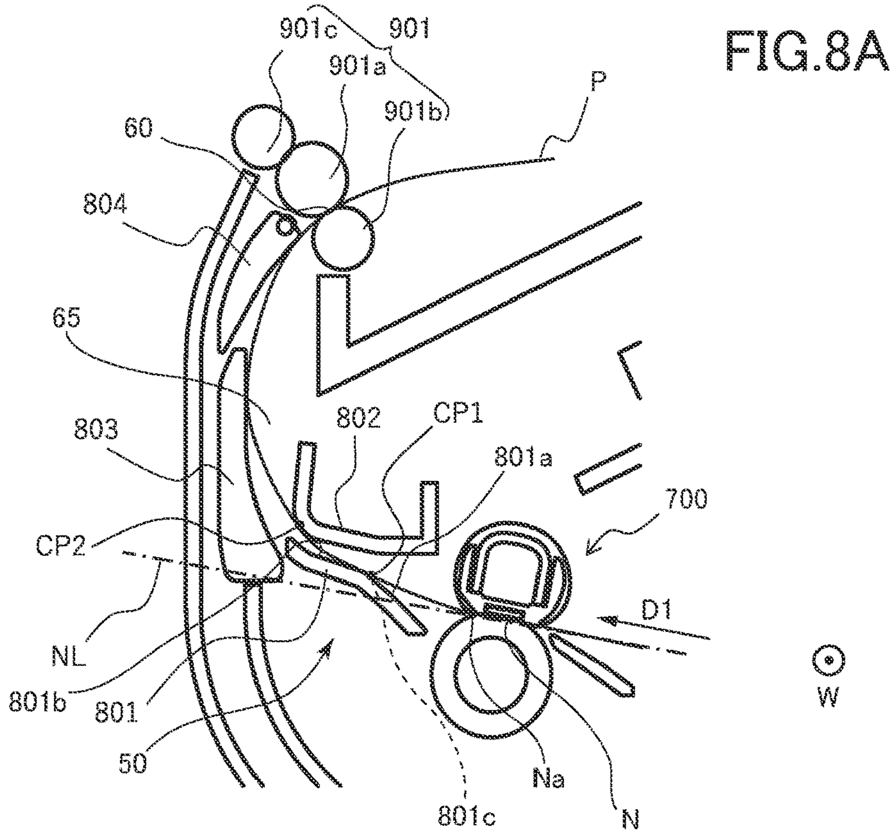
FIG. 8A is a cross-sectional view illustrating a guide unit of a fourth embodiment.
Figure 8B:
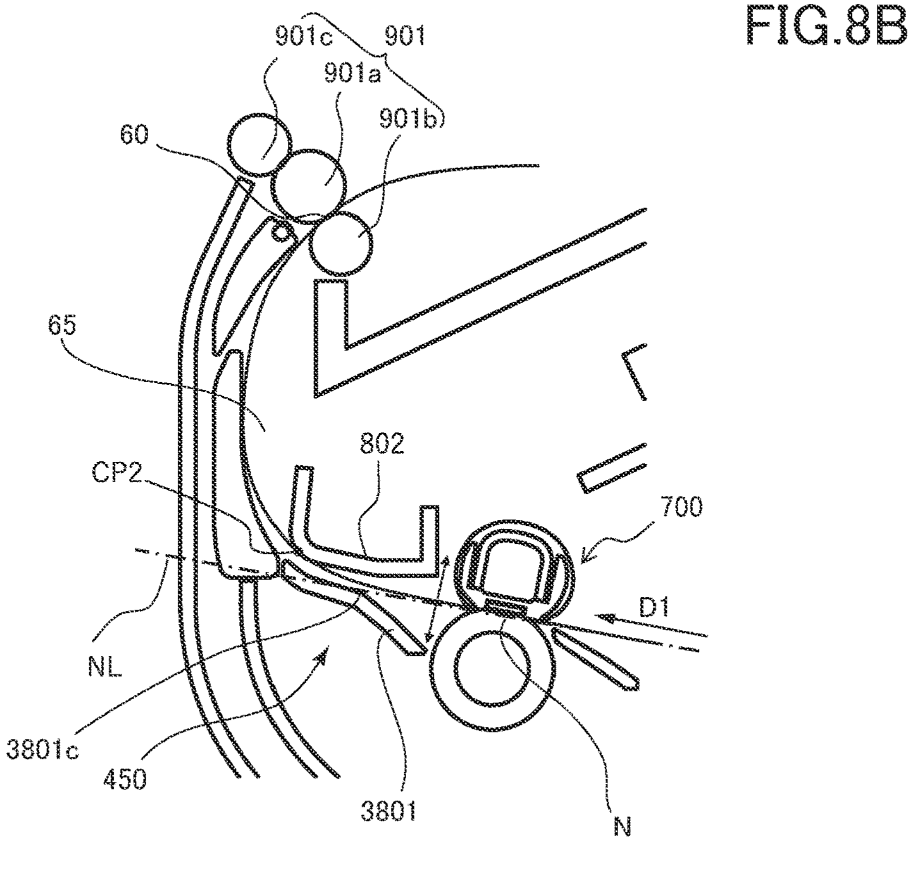
FIG. 8B is a cross-sectional view illustrating a guide unit of a comparative example.

8A is a cross-sectional view illustrating the guide unit 50, and FIG. 8B is a cross-sectional view illustrating a guide unit 450 of a comparative example. As illustrated in FIG. 8A, the guide unit 50 forms the curved conveyance path 65 curving with respect to the sheet conveyance direction D1, and guides the sheet P conveyed by the fixing unit 700 toward the sheet discharge roller unit 901. The guide unit 50 includes the first, second, and third guides 801, 802, and 803, and the guide member 804.

The first guide 801 is arranged downstream of the fixing unit 700 in the sheet conveyance direction D1, and guides the non-printing surface side of the sheet P The second guide 802 is arranged downstream of the fixing unit 700 in the sheet conveyance direction D1, and is arranged on an inner side in the curving direction of the curved conveyance path 65. Further, the second guide 802 guides the printing surface side of the sheet P by facing the first guide 801, and forms at least a part of the curved conveyance path 65 with the first guide 801.

The third guide 803 forms the part of the curved conveyance path 65, and guides the sheet P upward in the vertical direction. As described above, by pivoting, the guide member 804 sets the destination of the sheet P to either one of the sheet discharge nip 60 or the reverse nip 61, and forms part of the curved conveyance path 65.

The first guide 801 is arranged on the same side as the pressing roller 702 with respect to the curved conveyance path 65. The second guide 802 is arranged on the same side as the film 701 with respect to the curved conveyance path 65.

Hereinafter, a contact point of the sheet, which is conveyed through the curved conveyance path 65 by the fixing unit 700 and the sheet discharge nip 60 of the sheet discharge roller unit 901, and the first guide 801 is referred to as a first contact point CP1. Further, a contact point of the sheet, which is conveyed through the curved conveyance path 65 by the fixing unit 700 and the sheet discharge nip 60, and the second guide 802 is referred to as a second contact point CP2. In the present embodiment, the first contact point CP1 is closer to the second contact point CP2 than the fixing nip N of the fixing unit 700 in the sheet conveyance direction D1.

When viewed in the width direction W that is a direction orthogonal to a sheet surface of FIG. 8A, the first guide 801 is shaped into a convex arch that projects toward the second guide member 802. In particular, the first guide 801 includes a first guide surface 801*a* and a second guide surface 801*b* that is formed continuously to the vertex 801*c* which is a downstream end of the first guide surface 801*a* in the sheet conveyance direction D1. The first guide surface 801*a* extends to approach the second guide 802 toward the downstream side in the sheet conveyance direction D1. At the vertex 801*c*, the second guide surface 801*b* bends from the first guide surface 801*a*, and extends along the second guide 802.

That is, the first guide 801 forms the concave shape in which the vertex 801*c* serves as the projecting tip between the first and second guide surfaces 801*a* and 801*b*. In the present embodiment, when viewed in the width direction W, the first contact point CP1 is corresponds to the vertex 801*c* of the first guide 801.

The leading edge of the sheet P conveyed by the fixing unit 700 through the curved conveyance path 65 first comes into contact with the first guide surface 801*a* of the first guide 801. This is because the first guide surface 801*a* is arranged to intersect with the nip line NL of the fixing nip N. Then, the sheet P is guided toward the third guide 803 by the first guide surface 801*a* and the second guide 802. The sheet P is further guided upward by the third guide 803, and guided to the sheet discharge nip 60 by the guide member 804. That is, by the guide unit 50, the sheet P is curved toward the printing surface side, and is reoriented. At this time, the sheet P is conveyed with the posture of the sheet P regulated through contact with three points: the downstream end portion Na in the sheet conveyance direction D1 of the fixing nip N, the first contact point CP1, and the second contact point CP2. Therefore, the vibration of the sheet P in a thickness direction of the sheet P is reduced, and the sheet P is conveyed with the posture stabilized.

Here, using FIG. 9, a mechanism by which the wrinkles are generated in the sheet P that is conveyed through the curved conveyance path 65 will be described. To be noted, FIG. 9 has the same configuration as the comparative example illustrated in FIG. 8B, and a configuration of a first guide 3801 differs from the fourth embodiment.

Figure 9:
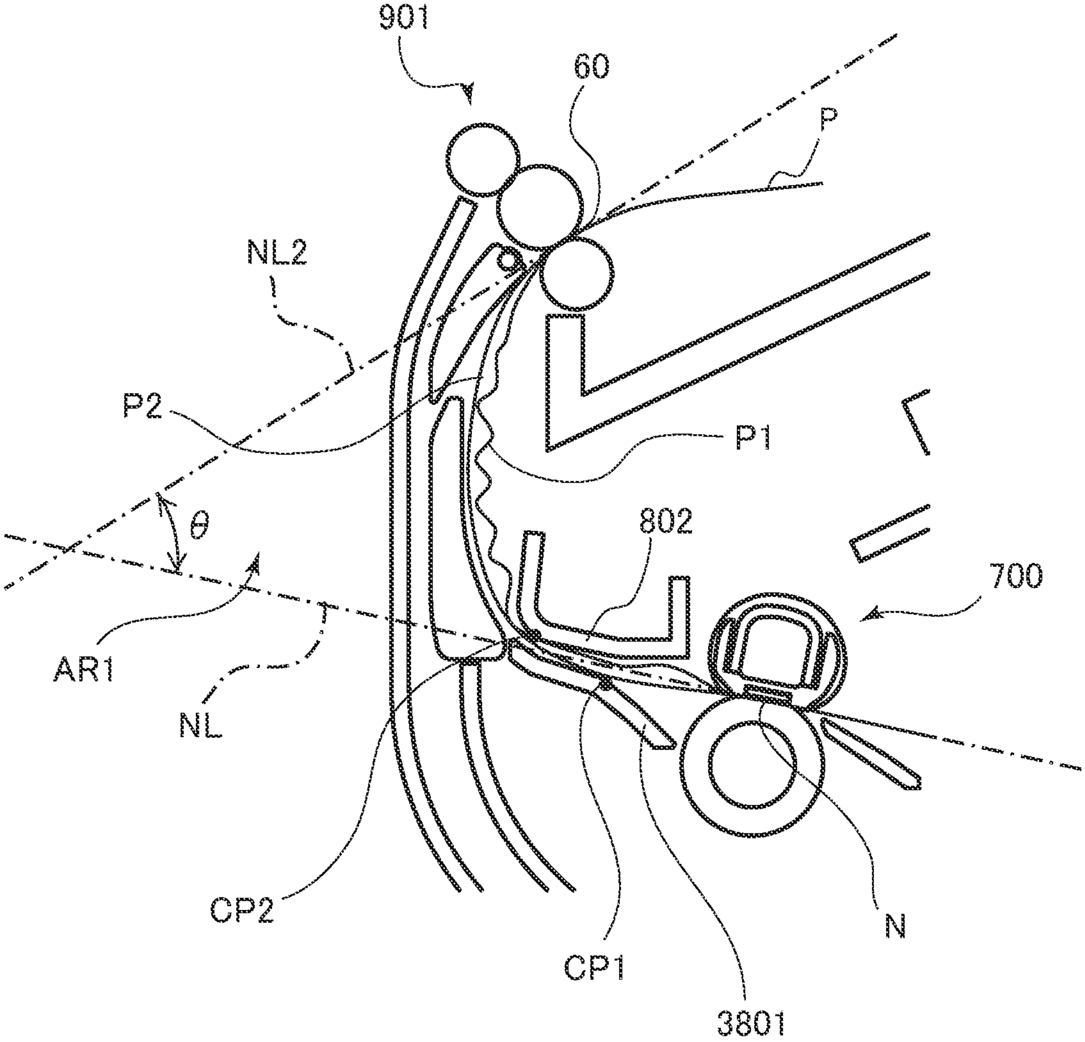
FIG. 9 is a diagram illustrating a mechanism that generates wrinkles in the sheet conveyed through a curved conveyance path.

As illustrated in FIG. 9, a situation in which a double-layered sheet P with three sides restrained like an envelope is conveyed through the curved conveyance path 65 is considered. Here, a sheet on the inner curvature of the sheet P is referred to as an inner sheet P1, and a sheet on the outer curvature of the sheet P is referred to as an outer sheet P2. When the sheet P is conveyed through the curved conveyance path 65, slackness is generated in the inner sheet P1 by a difference between conveyance distances (conveyance speeds) of the inner and outer sheets P1 and P2.

In the present embodiment, an angle θ formed by the nip line NL of the fixing nip N and a nip line NL2 of the sheet discharge nip 60 is larger than 0 degrees and equal to or less than 90 degrees. In particular, when viewed in the width direction W, the angle θ is an angle formed by the nip line NL of the fixing nip N and the nip line NL2 of the sheet discharge nip 60, and, is an angle formed by an area AR1 that includes the second guide 802 among areas divided by the nip lines NL and NL2.

Since the curvature of the sheet P increases as the angle θ formed by the nip line NL of the fixing nip N and the nip line NL2 of the sheet discharge nip 60 decreases, the slackness of the inner sheet P1 increases. When the slackness is generated in the inner sheet P1, the second moment of area of the sheet P is locally altered in a portion where the slackness has occurred, which in turn increases the stiffness of the sheet P in the portion where the slackness has occurred in comparison with portions where the slackness does not occur.

Figure 10:
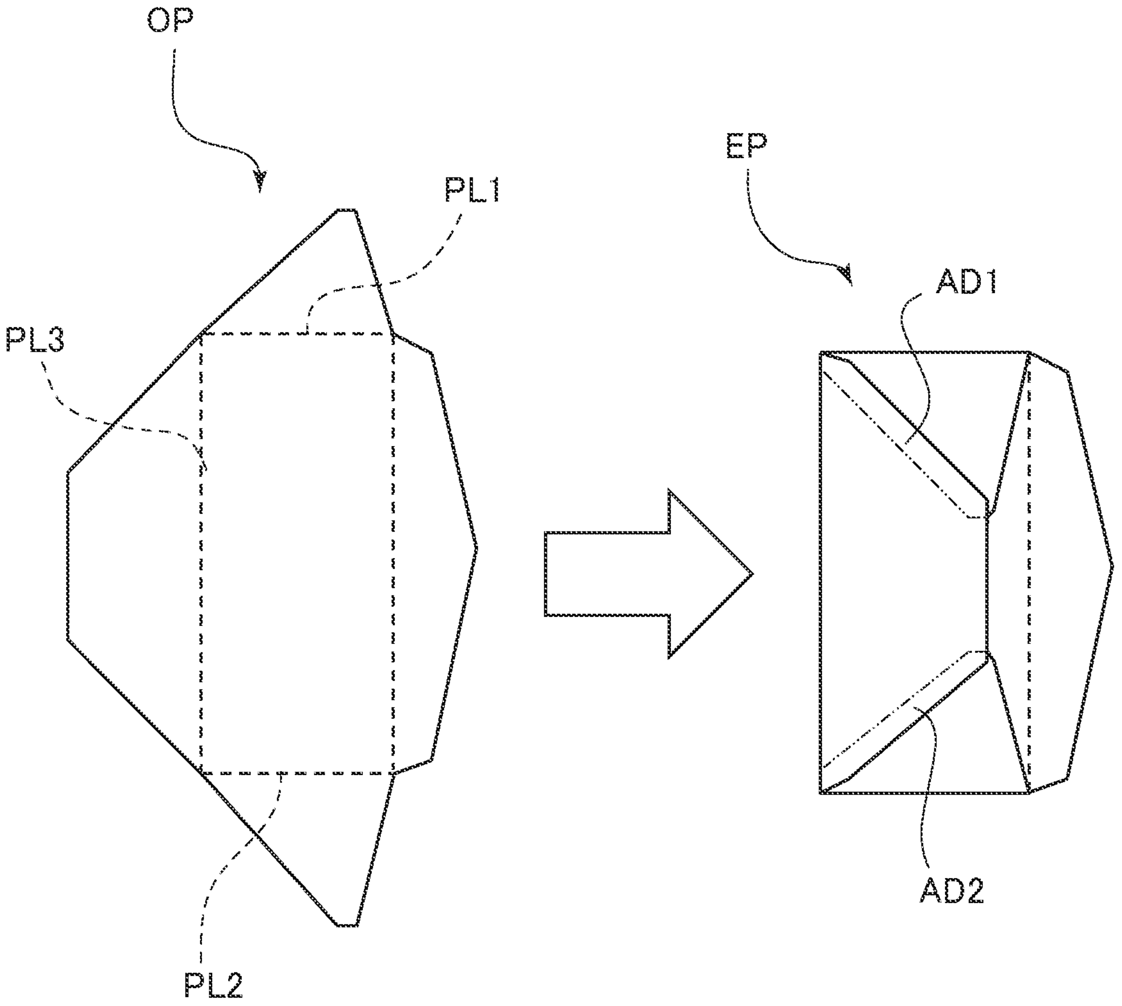
FIG. 10 is a diagram illustrating an envelope as an example of the sheet.

FIG. 10 is a diagram illustrating an envelope EP that is an example of the sheet P. The left side of FIG. 10 illustrates the envelope before folding, and the right side of FIG. 10 illustrates the envelope EP after a folding process has been completed. As illustrated in FIG. 10, the envelop EP is formed by first folding a single sheet of paper OP along fold lines PL1 and PL2, then folding the sheet along a fold line PL3, and finally adhering overlapping areas AD1 and AD2 to each other. That is, each of the areas AD1 and AD2 is in a state in which three layers of paper are laminated upon one another, and bending stiffness is locally high.

Based on the above, when the envelope continues to be conveyed in a curved state, the envelope may be folded at a point of a curvature change where the bending stiffness varies between high and low, and a tendency for folding is induced due to the slackness occurred in the inner sheet P1, which can sometimes subsequently lead to the occurrence of the wrinkles. Further, when the slackness occurs in the inner sheet P1 in the curved conveyance path 65 between the fixing nip N and the second contact point CP2 in the sheet conveyance direction D1, there is the risk that, when the inner sheet P1 comes into contact with the second contact point CP2, the slackness may develop the tendency for the folding as the wrinkles.

As illustrated in FIGS. 8B and 9, the first guide 3801 of the guide unit 450 of the comparative example does not come into contact with the sheet P that is conveyed by being nipped by the fixing nip N and the sheet discharge nip 60, and the first contact point (CP1) does not exist. That is, a vertex 3801c of the first guide 3801 is positioned on the other side of the second guide 802 with respect to the nip line NL of the fixing nip N.

In the comparative example, as illustrated in FIG. 8B, the posture of the sheet P which is being conveyed through the curved conveyance path 65 is regulated only by the second contact point CP2. Therefore, in the curved conveyance path 65, in a section of the curved conveyance path 65 from the fixing nip N to the second contact point CP2, the sheet P can vibrate in a thickness direction (arrow direction in FIG. 8B) of the sheet P. Therefore, since, in the comparative example, there exists a case where the sheet P is conveyed in the curved state also in the section of the curved conveyance path 65 from the fixing nip N to the second contact point CP2, the slackness may occur in the sheet P, so that the tendency for the folding, which leads to the formation of the wrinkles, is developed in the sheet P.

Therefore, there is a demand for a sheet conveyance apparatus that can suppress the formation of the wrinkles in the sheet with a simple configuration, and an image forming apparatus incorporating this sheet conveyance apparatus.

On the other hand, in the present embodiment, as illustrated in FIG. 8A, the first contact point CP1 is positioned upstream of the second contact point CP2 in the sheet conveyance direction D1, and, when viewed in the width direction W, is positioned on the same side as the second guide 802 with respect to the nip line NL of the fixing nip N. Then, as described above, the sheet P is conveyed with the posture regulated through contact with the three points: the downstream end portion Na of the fixing nip N and the first and second contact points CP1 and CP2. Therefore, the vibration of the sheet P in the thickness direction of the sheet P is reduced, and the sheet P is conveyed with slight curvature, while maintaining a stable posture.

As described above, in the present embodiment, even in a case where the double-layered sheet P, resembling the envelope, is conveyed through the curved conveyance path 65, the sheet becomes less likely to being folded to the printing surface side, and it is possible to suppress the occurrence of the slackness and wrinkles. Further, since the first and second guides 801 and 802 are a fixed guide fixed to a frame of the printer 1000, in comparison with such as a swing guide capable of swinging, it is possible to simplify a configuration, and it is possible to reduce costs.

Fifth Embodiment

While, next, a fifth embodiment of this disclosure will be described, in the fifth embodiment, a configuration of the heater holder 703 of the fourth embodiment is partially changed. Therefore, configurations similar to the fourth embodiment will be described by omitting illustrations or by putting the same reference characters on drawings herein.

Figure 11A:
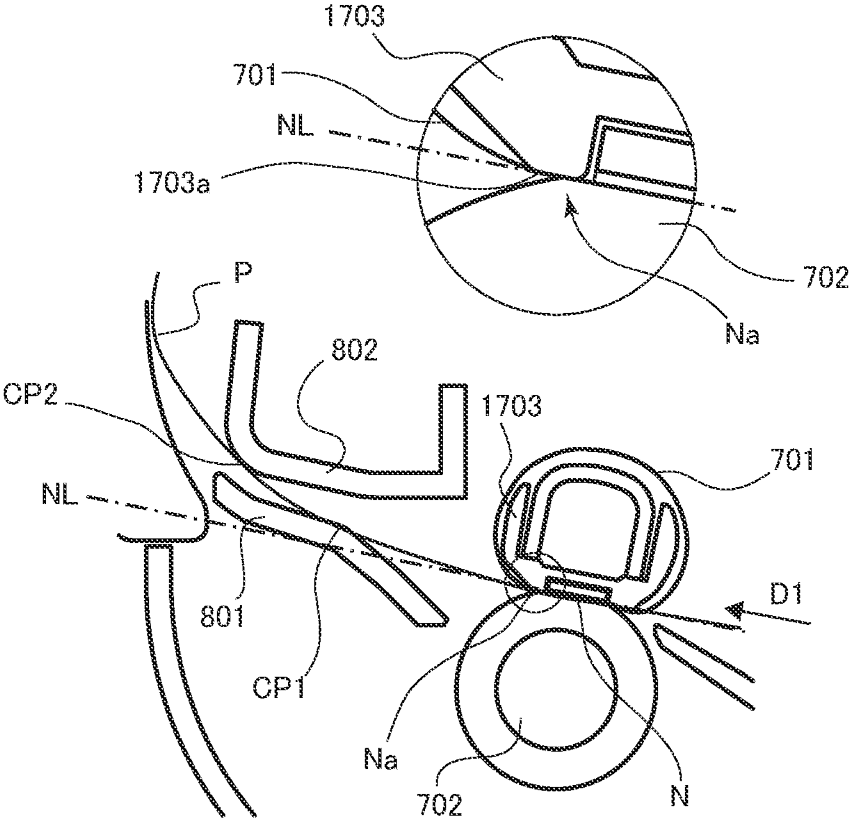
FIG. 11A contains a cross-sectional view and an enlarged cross-sectional view illustrating a heater holder of a fifth embodiment.
Figure 11B:
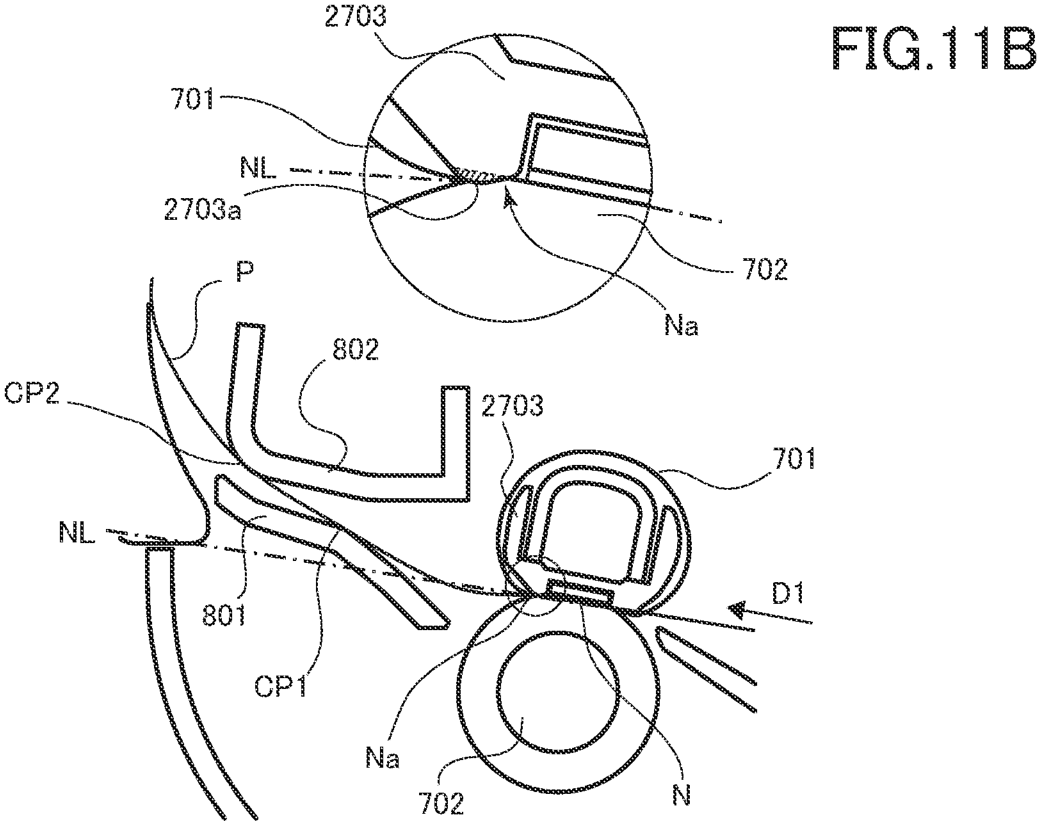
FIG. 11B contains a cross-sectional view and an enlarged cross-sectional view illustrating a heater holder of a comparative example of the fifth embodiment.

FIG. 11A contains a cross-sectional view and an enlarged cross-sectional view illustrating a heater holder 1703 of the fifth embodiment, and FIG. 11B contains a cross-sectional view and an enlarged cross-sectional view illustrating a heater holder 2703 related to a comparative example of the fifth embodiment. Each of the heater holders 1703 and 2703 respectively illustrated in FIGS. 11A and 11B has a function similar to the heater holder 703 of the fourth embodiment, and is also similar to the fourth embodiment in a peripheral configuration thereof.

As illustrated in FIG. 11A, at the downstream end portion Na in the sheet conveyance direction D1 of the fixing nip N, the heater holder 1703 includes a flat surface 1703a extending along the nip line NL. On the other hand, as illustrated in FIG. 11B, at the downstream end Na in the sheet conveyance direction D1 of the fixing nip N, the heater holder 2703 of the comparative example includes a projecting portion 2703a projecting toward the pressing roller 702.

By applying the pressure to the toner image T (refer to FIG. 2) fixed in the fixing nip N, the projecting portion 2703a serves to enhance glossiness (image sheen), and also contributes to the easy separation of the sheet P from the film 701. On the other hand, since the projecting portion 2703a locally abrades the film 701, sometimes, the wear of the film 701 and the image defects due to slippage of the toner image with respect to the film 701 immediately after the fixing may occur. As described above, depending on the physical properties of the toner and setting of the fixing temperature, the effects of the projecting portion 2703a can have advantages and disadvantages.

As illustrated in FIG. 11A, in the heater holder 1703 of the fifth embodiment, the projecting portion (2703a) is not disposed in the downstream end portion Na of the fixing nip N, and the heater holder 1703 includes the flat surface 1703a which is arranged at a downstream end portion Na. Also in this case, the first contact point CP1 is positioned upstream of the second contact point CP2 in the sheet conveyance direction D1, and, when viewed in the width direction W, is positioned on the same side as the second guide 802 with respect to the nip line NL of the fixing nip N. Further, as illustrated in FIG. 11B, also in the comparative example, the first contact point CP1 is positioned upstream of the second contact point CP2 in the sheet conveyance direction D1, and, when viewed in the width direction W, is positioned on the same side as the second guide 802 with respect to the nip line NL of the fixing nip N. Therefore, also in the fifth embodiment and in the comparative example of the fifth embodiment, effects similar to the fourth embodiment are produced.

Other Embodiment

To be noted, while, in any of the first to third embodiments, when viewed in the width direction, the first driven roller 805 is arranged such that the outer circumferential surface 805a slightly projects from the vertex 801c of the first guide 801 to the curved conveyance path 65, it is not limited to this. For example, it is acceptable to arrange the first driven roller 805 such that, when viewed in the width direction W, the outer circumferential surface 805a overlaps the vertex 801c of the first guide 801. Further, it is also acceptable to arrange the second driven roller 806 such that, when viewed in the width direction W, the outer circumferential surface 806a of the second driven roller 806 overlaps the second guide 802.

Further, while, in any of the embodiments described above, the heating unit 720 is urged toward the pressing roller 702, it is not limited to this. For example, it is acceptable to configure such that the pressing roller 702 is urged toward the heating unit 720.

Further, while, in any of the embodiments described above, the guide unit 50 arranged between the fixing unit 700 and the sheet discharge roller unit 901 in the sheet conveyance direction D1 and forming the curved conveyance path 65 is described, it is not limited to this. The guide unit 50 can be applied to any positions in the image forming apparatus, and, for example, it is acceptable to apply to such as a position downstream of the sheet feed unit 200 in the sheet conveyance direction D1 or the duplex conveyance unit 250. That is, rotary member pairs arranged upstream and downstream of the guide unit 50 in the sheet conveyance direction D1 are not limited to the fixing unit 700 and the sheet discharge roller pair 901, and can be other rotary member pairs. As the rotary member pairs, for example, a roller pair and a configuration in which one side is a roller and the other side is a belt are conceivable.

Further, while, in any of the embodiments described above, the sheet discharge roller unit 901 includes three rollers, namely, the sheet discharge drive roller 901*a*, the sheet discharge driven roller 901*b*, and the reverse driven roller 901*c*, it is not limited to this. For example, the sheet discharge roller unit may be constituted from two sets of roller pairs. Further, in a case of not performing the duplex printing, the sheet discharge roller unit may be constituted from a single roller pair performing the discharge of the sheet. Further, rollers constituting these sheet discharge roller units may be constituted from a so-called comb teeth roller in which the rollers offset each other in the width direction W, and partially overlap each other in the thickness direction of the sheet.

Further, while, in any of the embodiments described above, the first guide 801 is formed to bend at the vertex 801*c* between the first and second guide surfaces 801*a* and 801*b*, it is not limited to this. For example, the first guide 801 may include a curved surface that connects between the first and second surfaces 801*a* and 801*b*. It is acceptable that, after the trailing edge Pa of the sheet P has passed through the fixing nip N, the first guide 801 of the first to third embodiments is formed to first come into contact with the sheet P at the first contact point CP1, and it is acceptable that the first guide 801 is formed so as not to intersect with the straight line SL2 except at the first contact point CP (vertex 801*c*). Further, the first guide 801 of the fourth or fifth embodiment may be configured such that the first guide 801 comes into contact with the sheet P conveyed by the fixing nip N and the sheet discharge nip 60 at the first contact point CP1 that is closer to the second guide 802 than the nip line NL.

Further, while the heating unit 720 is configured to heat the film 701, it is not limited to this. For example, the heating unit 720 may be constituted from a heating roller accommodating a heater. Further, various types of heaters, such as ceramic heaters, carbon heaters, or halogen heaters can be applied to the heater. Further, the heating unit 720 may be configured to heat a heat generation layer of a belt by electromagnetic induction heating.

Further, while, in any of the embodiments described above, descriptions are provided using the printer 1000 of the electrophotographic system as an example of the image forming apparatus, this disclosure is not limited to this. The image forming apparatus includes a printers, a copy machine, a facsimile, and a multifunction machine, and refers to an apparatus that forms the image on the sheet, used as a recording medium, based on the image information input from an external personal computer (PC) and the image information read from the document. Further, while, sometimes, there is a case where, in addition to the apparatus body having an image forming function, a peripheral apparatus such as an option feeder, an image reading apparatus, and a sheet conveyance apparatus is connected, an entire system to which the peripheral apparatus is connected is also considered as a type of the image forming apparatus.

Further, while in the present embodiments, the image forming unit PU that directly transfers the image from the photosensitive drum 501 to the sheet P is used, it is not limited to this. For example, it is acceptable to use an image forming unit of an intermediate transfer type that, after having transferred the toner image from the photosensitive drum onto an intermediate transfer member, secondarily transfers the toner image from the intermediate transfer member onto the sheet P. Further, the image forming unit PU may be configured to form the image by superimposing the toner images, formed on a plurality of photosensitive drums using the toners whose colors are different from each other, on the sheet.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-033989, filed Mar. 6, 2023, and Japanese Patent Application No. 2023-033990, filed Mar. 6, 2023, which are hereby incorporated by reference herein in their entirety.

What is claimed is:

1. A sheet conveyance apparatus comprising:

a first conveyance unit configured to form a first nip portion, the first conveyance unit being configured to convey a sheet in a sheet conveyance direction by the first nip portion;

a second conveyance unit arranged downstream of the first conveyance unit in the sheet conveyance direction and configured to form a second nip portion, the second conveyance unit being configured to convey the sheet by the second nip portion; and a guide unit configured to form a curved conveyance path that curves with respect to the sheet conveyance direction, the guide unit being configured to guide the sheet conveyed by the first conveyance unit to the second conveyance unit, wherein the guide unit includes:

a first guide;

a second guide configured to form at least a part of the curved conveyance path with the first guide, the first guide forming an outer side of the curved conveyance path, the second guide forming an inner side of the curved conveyance path;

a first driven roller rotatably supported by the first guide, and rotatably driven with respect to the sheet by coming into contact with the sheet, at a first contact point, conveyed through the curved conveyance path by the second conveyance unit; and a second driven roller rotatably supported by the second guide and arranged downstream of the first driven roller in the sheet conveyance direction, the second driven roller being rotatably driven with respect to the sheet by coming into contact with the sheet, at a second contact point, conveyed through the curved conveyance path by the second conveyance unit, wherein, when viewed in a width direction orthogonal to the sheet conveyance direction, a part of the first guide is formed so as not to intersect with a straight line passing through the first contact point and the second contact point, and is positioned upstream of the first contact point in the sheet conveyance direction, and wherein a horizontal component of the sheet conveyance direction in which the first nip portion of the first conveyance unit conveys the sheet is opposite to a horizontal component of a direction in which the second nip portion of the second conveyance unit conveys the sheet.

2. The sheet conveyance apparatus according to claim 1, wherein the first guide includes:

a first guide surface extending to approach the second guide toward a downstream side in the sheet conveyance direction, the first guide surface being formed so as not to intersect with the straight line; and a second guide surface formed continuously from a vertex that is a downstream end of the first guide surface in the sheet conveyance direction, the second guide surface bending at the vertex from the first guide surface, and extending along the second guide, and wherein, when viewed in the width direction, the first driven roller is arranged so as to overlap the vertex.

3. The sheet conveyance apparatus according to claim 2, wherein, when viewed in the width direction, an outer circumferential surface of the first driven roller is arranged so as to be more projected into the curved conveyance path than the vertex.

4. The sheet conveyance apparatus according to claim 2, wherein, when viewed in the width direction, the first guide surface is arranged so as to intersect with a nip line of the first nip portion.

5. The sheet conveyance apparatus according to claim 2, wherein, when viewed in the width direction, the first contact point is closer with respect to a straight line passing through the second contact point and a downstream end portion, in the sheet conveyance direction, of the first nip portion than an upstream end, in the sheet conveyance direction, of the first guide surface.

6. The sheet conveyance apparatus according to claim 2, wherein the first guide surface and the second guide surface are constituted by distal end portions of a plurality of ribs disposed on the first guide.

7. The sheet conveyance apparatus according to claim 1, wherein each of the first driven roller and the second driven roller is configured so as not to nip the sheet conveyed through the curved conveyance path.

8. The sheet conveyance apparatus according to claim 1, wherein a rotation shaft of the first driven roller and a rotation shaft of the second driven roller are parallel to the width direction.

9. The sheet conveyance apparatus according to claim 1, wherein a rotation shaft of the first driven roller and a rotation shaft of the second driven roller are inclined with respect to the width direction.

10. The sheet conveyance apparatus according to claim 1, further comprising:

a casing accommodating the first conveyance unit, the second conveyance unit, and the guide unit, and including an opening; and a door supported by the casing and configured to open and close the opening, wherein, when the door is opened, a gap between the first guide and the second guide is exposed an outside of the sheet conveyance apparatus via the opening, and wherein the first guide and the second guide are configured so as not to allow a user to access the first conveyance unit via the gap.

11. The sheet conveyance apparatus according to claim 1, further comprising:

a casing accommodating the first conveyance unit, the second conveyance unit, and the guide unit, and including an opening; and a door supported by the casing and configured to open and close the opening, wherein, when the door is opened, a gap between the first guide and the second driven roller is exposed an outside of the sheet conveyance apparatus via the opening, and wherein the first guide and the second driven roller are configured so as not to allow a user to access the first conveyance unit via the gap.

12. The sheet conveyance apparatus according to claim 1, wherein the first conveyance unit includes a heating rotary member and a pressing rotary member configured to fix a toner image transferred onto the sheet on the sheet, and wherein the first driven roller is arranged on the same side as the pressing rotary member with respect to the curved conveyance path.

13. The sheet conveyance apparatus according to claim 12, wherein the heating rotary member is a film.

14. The sheet conveyance apparatus according to claim 12, wherein the width direction is a direction parallel to a rotation shaft of the pressing rotary member.

15. The sheet conveyance apparatus according to claim 1, wherein the second conveyance unit includes a sheet discharge roller pair that discharges the sheet outside of the sheet conveyance apparatus.

16. An image forming apparatus comprising:

an image forming unit configured to form an image on a sheet; and the sheet conveyance apparatus according to claim 1.

17. A sheet conveyance apparatus comprising:

a first conveyance unit configured to form a first nip portion, the first conveyance unit being configured to convey a sheet in a sheet conveyance direction by the first nip portion;

a second conveyance unit arranged downstream of the first conveyance unit in the sheet conveyance direction, the second conveyance unit being configured to convey the sheet; and a guide unit configured to form a curved conveyance path that curves with respect to the sheet conveyance direction, the guide unit being configured to guide the sheet conveyed by the first conveyance unit to the second conveyance unit, wherein the guide unit includes:

a first guide;

a second guide configured to form at least a part of the curved conveyance path with the first guide, the first guide forming an outer side of the curved conveyance path, the second guide forming an inner side of the curved conveyance path;

a first driven roller rotatably supported by the first guide, and rotatably driven with respect to the sheet by coming into contact with the sheet, at a first contact point, conveyed through the curved conveyance path by the second conveyance unit; and a second driven roller rotatably supported by the second guide and arranged downstream of the first driven roller in the sheet conveyance direction, the second driven roller being rotatably driven with respect to the sheet by coming into contact with the sheet, at a second contact point, conveyed through the curved conveyance path by the second conveyance unit, wherein, when viewed in a width direction orthogonal to the sheet conveyance direction, a part of the first guide is formed so as not to intersect with a straight line passing through the first contact point and the second contact point, and is positioned upstream of the first contact point in the sheet conveyance direction, and wherein the first guide is disposed below the sheet conveyed by the first conveyance unit to the second conveyance unit.

18. The sheet conveyance apparatus according to claim 17, wherein the first guide includes:

a first guide surface extending to approach the second guide toward a downstream side in the sheet conveyance direction, the first guide surface being formed so as not to intersect with the straight line; and a second guide surface formed continuously from a vertex that is a downstream end of the first guide surface in the sheet conveyance direction, the second guide surface bending at the vertex from the first guide surface, and extending along the second guide, and wherein, when viewed in the width direction, the first driven roller is arranged so as to overlap the vertex.

19. The sheet conveyance apparatus according to claim 18, wherein, when viewed in the width direction, an outer circumferential surface of the first driven roller is arranged so as to be more projected into the curved conveyance path than the vertex.

20. The sheet conveyance apparatus according to claim 18, wherein, when viewed in the width direction, the first guide surface is arranged so as to intersect with a nip line of the first nip portion.

* * * * *